United States Patent
Masuda et al.

(10) Patent No.: US 10,562,585 B2
(45) Date of Patent: Feb. 18, 2020

(54) BICYCLE OPERATING DEVICE

(71) Applicant: SHIMANO INC., Sakai (JP)

(72) Inventors: Takaya Masuda, Sakai (JP); Tsutomu Nanase, Sakai (JP); Kentaro Kosaka, Sakai (JP)

(73) Assignee: SHIMANO INC., Sakai (JP)

( * ) Notice: Subject to any disclaimer, the term of this patent is extended or adjusted under 35 U.S.C. 154(b) by 92 days.

(21) Appl. No.: 15/614,509

(22) Filed: Jun. 5, 2017

(65) Prior Publication Data

US 2018/0346069 A1 Dec. 6, 2018

(51) Int. Cl.
*B62K 23/06* (2006.01)
*B62M 25/08* (2006.01)
*B62L 3/02* (2006.01)

(52) U.S. Cl.
CPC .............. *B62K 23/06* (2013.01); *B62L 3/02* (2013.01); *B62M 25/08* (2013.01)

(58) Field of Classification Search
CPC ........ F16H 59/10; F16H 59/105; F16H 59/12; F16H 59/044; B62M 25/08; B62K 23/06; B62L 13/02; H01H 13/58; H01H 13/60; H01H 13/68; H01H 19/63; H01H 19/6355
USPC .............................. 74/473.12, 473.13, 473.3
See application file for complete search history.

(56) References Cited

U.S. PATENT DOCUMENTS

| | | | |
|---|---|---|---|
| 7,759,587 B2* | 7/2010 | Kim | G04C 3/001 200/18 |
| 7,854,180 B2* | 12/2010 | Tetsuka | B62K 23/06 74/473.12 |
| 7,947,914 B2 | 5/2011 | Takebayashi et al. | |
| 8,360,909 B2 | 1/2013 | Ichida | |
| 9,056,651 B2* | 6/2015 | Tetsuka | B62L 3/02 |
| 9,157,523 B2* | 10/2015 | Miki | F16H 59/044 |
| 9,211,936 B2* | 12/2015 | Gao | B62L 3/02 |
| 2013/0192407 A1* | 8/2013 | Fujii | B62M 25/08 74/491 |
| 2014/0053675 A1* | 2/2014 | Tetsuka | B62M 25/08 74/473.13 |
| 2014/0102237 A1* | 4/2014 | Jordan | B62K 23/02 74/473.12 |

(Continued)

FOREIGN PATENT DOCUMENTS

| | | | | |
|---|---|---|---|---|
| DE | 701023 C | * | 1/1941 | ......... H01H 19/6355 |
| EP | 1406277 A2 | * | 4/2004 | ............ H01H 19/63 |
| EP | 1787903 | | 5/2007 | |

*Primary Examiner* — William Kelleher
*Assistant Examiner* — Bobby Rushing, Jr.
(74) *Attorney, Agent, or Firm* — Mori & Ward, LLP

(57) ABSTRACT

A bicycle operating device comprises a base member, a switch structure, an operating structure, and a controller. The switch structure comprises a first electrical switch and a second electrical switch. The first electrical switch has a first operated state. The second electrical switch has a second operated state. The operating structure includes an operating member. The controller is configured to respectively generate a first control signal and a second control signal based on a first signal pattern and a second signal pattern. The first signal pattern includes a first combination of the first operated state and the second operated state. The second signal pattern including a second combination of the first operated state and the second operated state. The second combination is different from the first combination.

29 Claims, 25 Drawing Sheets

(56) References Cited

U.S. PATENT DOCUMENTS

2015/0284049 A1\* 10/2015 Shipman ................ B62M 25/08
74/473.12

\* cited by examiner

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device

SUMMARY OF THE INVENTION

In accordance with a first aspect of the present invention, a bicycle operating device comprises a base member, a switch structure, an operating structure, and a controller. The switch structure comprises a first electrical switch and a second electrical switch. The first electrical switch is configured to generate a first signal. The first electrical switch has a first operated state. The second electrical switch is configured to generate a second signal. The second electrical switch has a second operated state. The operating structure includes an operating member movably coupled to the base member. The operating member is movable relative to the base member in response to a first user input operation to provide a first movement. The operating member is movable relative to the base member in response to a second user input operation to provide a second movement different from the first movement. The operating structure is operatively coupled to the switch structure to generate a first signal pattern including at least one of the first signal and the second signal in response to the first user input operation. The operating structure is operatively coupled to the switch structure to generate a second signal pattern including at least one of the first signal and the second signal in response to the second user input operation. The second user input operation is different from the first user input operation. The second signal pattern is different from the first signal pattern. The controller is configured to respectively generate a first control signal and a second control signal based on the first signal pattern and the second signal pattern. The first signal pattern includes a first combination of the first operated state and the second operated state. The second signal pattern including a second combination of the first operated state and the second operated state. The second combination is different from the first combination.

With the bicycle operating device according to the first aspect, it is possible to operate the first electrical switch and the second electrical switch using the operating member of the operating structure.

In accordance with a second aspect of the present invention, the bicycle operating device according to the first aspect is configured so that the first movement has a first amount of movement of the operating member. The second movement has a second amount of movement of the operating member. The second amount of movement is different from the first amount of movement.

With the bicycle operating device according to the second aspect, the difference between the first amount of movement and the second amount of movement allows the user to distinguish the first movement and the second movement of the operating member.

In accordance with a third aspect of the present invention, the bicycle operating device according to the second aspect is configured so that the operating member is pivotable relative to the base member about a pivot axis. The first movement includes a first pivotal movement having a first pivot angle corresponding to the first amount of movement. The second movement includes a second pivotal movement having a second pivot angle corresponding to the second amount of movement. The second pivot angle is different from the first pivot angle.

With the bicycle operating device according to the third aspect, the difference between the first pivot angle and the second pivot angle allows the user to distinguish the first movement and the second movement of the operating member.

In accordance with a fourth aspect of the present invention, the bicycle operating device according to any one of the first to third aspects is configured so that the operating structure includes an intermediate structure provided between the operating member and the switch structure to transmit each of the first movement and the second movement to the switch structure.

With the bicycle operating device according to the fourth aspect, it is possible to transmit the first movement and the second movement of the operating member to the switch structure.

In accordance with a fifth aspect of the present invention, the bicycle operating device according to the fourth aspect is configured so that the intermediate structure includes a first cam and a second cam. The first cam is movable relative to the base member to press the first electrical switch in response to at least one of the first movement and the second movement. The second cam is movable relative to the base member to press the second electrical switch in response to at least one of the first movement and the second movement.

With the bicycle operating device according to the fifth aspect, it is possible to transmit the first movement and the second movement of the operating member to the switch structure with the first cam and the second cam.

In accordance with a sixth aspect of the present invention, the bicycle operating device according to the fifth aspect is configured so that the intermediate structure includes a rotatable member rotatably coupled to the base member about a rotational axis. The first cam and the second cam are coupled to the rotatable member to rotate relative to the base member along with the rotatable member about the rotational axis.

With the bicycle operating device according to the sixth aspect, it is possible to simplify the intermediate structure.

In accordance with a seventh aspect of the present invention, the bicycle operating device according to the sixth aspect is configured so that the intermediate structure includes a first follower and a second follower. The first follower is provided between the first cam and the first electrical switch to be contactable with the first cam. The second follower is provided between the second cam and the second electrical switch to be contactable with the second cam.

With the bicycle operating device according to the seventh aspect, it is possible to transmit the first movement and the second movement of the operating member to the switch structure with the first cam, the second cam, the first follower, and the second follower.

In accordance with an eighth aspect of the present invention, the bicycle operating device according to the seventh aspect is configured so that the first cam is rotatable relative to the base member on a first path in response to a rotation of the rotatable member. The second cam is rotatable relative to the base member on a second path in response to a rotation of the rotatable member. The first follower is provided on the first path to be contactable with the first cam. The second follower is provided on the second path to be contactable with the second cam.

With the bicycle operating device according to the eighth aspect, it is possible to certainly transmit the first movement and the second movement of the operating member to the switch structure with the first cam, the second cam, the first follower, and the second follower.

In accordance with a ninth aspect of the present invention, the bicycle operating device according to the seventh or eighth aspect is configured so that the first follower and second follower are arranged in an axial direction of the rotational axis.

With the bicycle operating device according to the ninth aspect, it is possible to make the intermediate structure compact in a direction different from the axial direction.

In accordance with a tenth aspect of the present invention, the bicycle operating device according to any one of the fifth to ninth aspects is configured so that the second cam is offset from the first cam in a rotational direction of the rotatable member.

With the bicycle operating device according to the tenth aspect, it is possible to simplify the intermediate structure.

In accordance with an eleventh aspect of the present invention, the bicycle operating device according to any one of the fifth to tenth aspects is configured so that the rotatable member includes a first surface and a second surface. The second surface is provided on a reverse side of the first surface in an axial direction of the rotational axis. The first cam is provided on the first surface. The second cam is provided on the second surface.

With the bicycle operating device according to the eleventh aspect, it is possible to make the intermediate structure compact in a direction different from the axial direction.

In accordance with a twelfth aspect of the present invention, the bicycle operating device according to the eleventh aspect is configured so that the first cam extends from the first surface in the axial direction. The second cam extends from the second surface in the axial direction.

With the bicycle operating device according to the twelfth aspect, it is possible to simplify the intermediate structure.

In accordance with a thirteenth aspect of the present invention, the bicycle operating device according to any one of the fifth to twelfth aspects is configured so that the first cam includes a first curved surface. The second cam includes a second curved surface.

With the bicycle operating device according to the thirteenth aspect, it is possible to smoothly transmit the first movement and the second movement of the operating member to the switch structure with the first cam and the second cam.

In accordance with a fourteenth aspect of the present invention, the bicycle operating device according to any one of the fifth to thirteenth aspects is configured so that the operating member is movable relative to the base member in response to a third user input operation to provide a third movement. The third user input operation is different from the first user input operation and the second user input operation. The intermediate structure includes a third cam and a fourth cam. The third cam is movable relative to the base member to press the first electrical switch in response to at least one of the first movement, the second movement, and the third movement. The fourth cam is movable relative to the base member to press the second electrical switch in response to at least one of the first movement, the second movement, and the third movement.

With the bicycle operating device according to the fourteenth aspect, it is possible to transmit the first movement, the second movement, and the third movement of the operating member to the switch structure.

In accordance with a fifteenth aspect of the present invention, the bicycle operating device according to the fourteenth aspect is configured so that the second cam is offset from the first cam in a rotational direction of the rotatable member. The third cam is offset from the first cam and the second cam in the rotational direction. The fourth cam is offset from the first cam and the second cam in the rotational direction.

With the bicycle operating device according to the fifteenth aspect, it is possible to simplify the intermediate structure with enabling the structure configured to transmit the first movement, the second movement, and the third movement of the operating member to the switch structure.

In accordance with a sixteenth aspect of the present invention, the bicycle operating device according to the fifteenth aspect is configured so that the second cam is offset from the first cam in a rotational direction of the rotatable member. The fourth cam is provided at a circumferential position equal to a circumferential position of the third cam in the rotational direction.

With the bicycle operating device according to the sixteenth aspect, it is possible to simplify the intermediate structure with enabling the structure configured to transmit the first movement, the second movement, and the third movement of the operating member to the switch structure.

In accordance with a seventeenth aspect of the present invention, the bicycle operating device according to any one of the fourteenth to sixteenth aspects is configured so that the rotatable member includes a first surface and a second surface. The second surface is provided on a reverse side of the first surface in an axial direction of the rotational axis. The first cam and the third cam are provided on the first surface. The second cam and the fourth cam are provided on the second surface.

With the bicycle operating device according to the seventeenth aspect, it is possible to make the intermediate structure compact in a direction different from the axial direction.

In accordance with a eighteenth aspect of the present invention, the bicycle operating device according to the seventeenth aspect is configured so that the first cam and the third cam extend from the first surface in the axial direction. The second cam and the fourth cam extend from the second surface in the axial direction.

With the bicycle operating device according to the eighteenth aspect, it is possible to make the intermediate structure compact in the direction different from the axial direction with enabling the structure configured to transmit the first movement, the second movement, and the third movement of the operating member to the switch structure.

In accordance with a nineteenth aspect of the present invention, the bicycle operating device according to the fourteenth aspect is configured so that the first cam includes a first curved surface. The second cam includes a second curved surface. The third cam includes a third curved surface. The fourth cam includes a fourth curved surface.

With the bicycle operating device according to the nineteenth aspect, it is possible to smoothly transmit the first movement, the second movement, and the third movement of the operating member to the switch structure with the first cam, the second cam, the third cam, and the fourth cam.

In accordance with a twentieth aspect of the present invention, the bicycle operating device according to any one of the first to nineteenth aspects is configured so that the controller includes a wireless communicator. The wireless communicator is electrically connected to the first electrical switch and the second electrical switch to wirelessly transmit the first control signal based on the first signal pattern. The wireless communicator is electrically connected to the first electrical switch and the second electrical switch to wirelessly transmit the second control signal based on the second signal pattern.

With the bicycle operating device according to the twentieth aspect, it is possible to wirelessly operate a bicycle component.

In accordance with a twenty-first aspect of the present invention, the bicycle operating device according to any one of the first to twentieth aspects is configured so that the controller is configured to determine the first operated state based on the first signal. The controller is configured to determine the second operated state based on the second signal.

With the bicycle operating device according to the twenty-first aspect, it is possible to easily determine the first operated state and the second operated state.

In accordance with a twenty-second aspect of the present invention, the bicycle operating device according to any one of the first to twenty-first aspects is configured so that the first operated state has a first OFF state and a first ON state to generate the first signal. The second operated state has a second OFF state and a second ON state to generate the second signal. The controller is configured to determine the first OFF state and the first ON state based on the first signal. The controller is configured to determine the second OFF state and the second ON state based on the second signal.

With the bicycle operating device according to the twenty-second aspect, it is possible to easily determine the first operated state and the second operated state.

In accordance with a twenty-third aspect of the present invention, the bicycle operating device according to the twenty-second aspect is configured so that the first signal pattern includes a first combination of the first signal and the second signal. The second signal pattern includes a second combination of the first signal and the second signal. The second combination is different from the first combination.

With the bicycle operating device according to the twenty-third aspect, it is possible to easily determine the first signal pattern and the second signal pattern.

In accordance with a twenty-fourth aspect of the present invention, the bicycle operating device according to the twenty-second or twenty-third aspect is configured so that the controller is configured to determine the first signal pattern and the second signal pattern based on an order of at least one of the first signal and the second signal.

With the bicycle operating device according to the twenty-fourth aspect, it is possible to easily determine the first signal pattern and the second signal pattern.

In accordance with a second aspect of the present invention, a bicycle operating device comprises a base member, an operating structure, and a controller. The operating structure includes an operating member movably coupled to the base member. The operating member is movable relative to the base member in response to a first user input operation to provide a first movement having a first amount of movement of the operating member. The operating member is movable relative to the base member in response to a second user input operation to provide a second movement having a second amount of movement of the operating member. The second amount of movement is different from the first amount of movement. The controller is configured to respectively generate a first control signal in response to the first user input operation and a second control signal in response to the second user input operation. The first control signal is different from the second control signal. The controller includes a wireless communicator configured to wirelessly transmit the first control signal and the second control signal.

With the bicycle operating device according to the twenty-fifth aspect, it is possible to wirelessly operate a bicycle component using the operating member of the operating structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
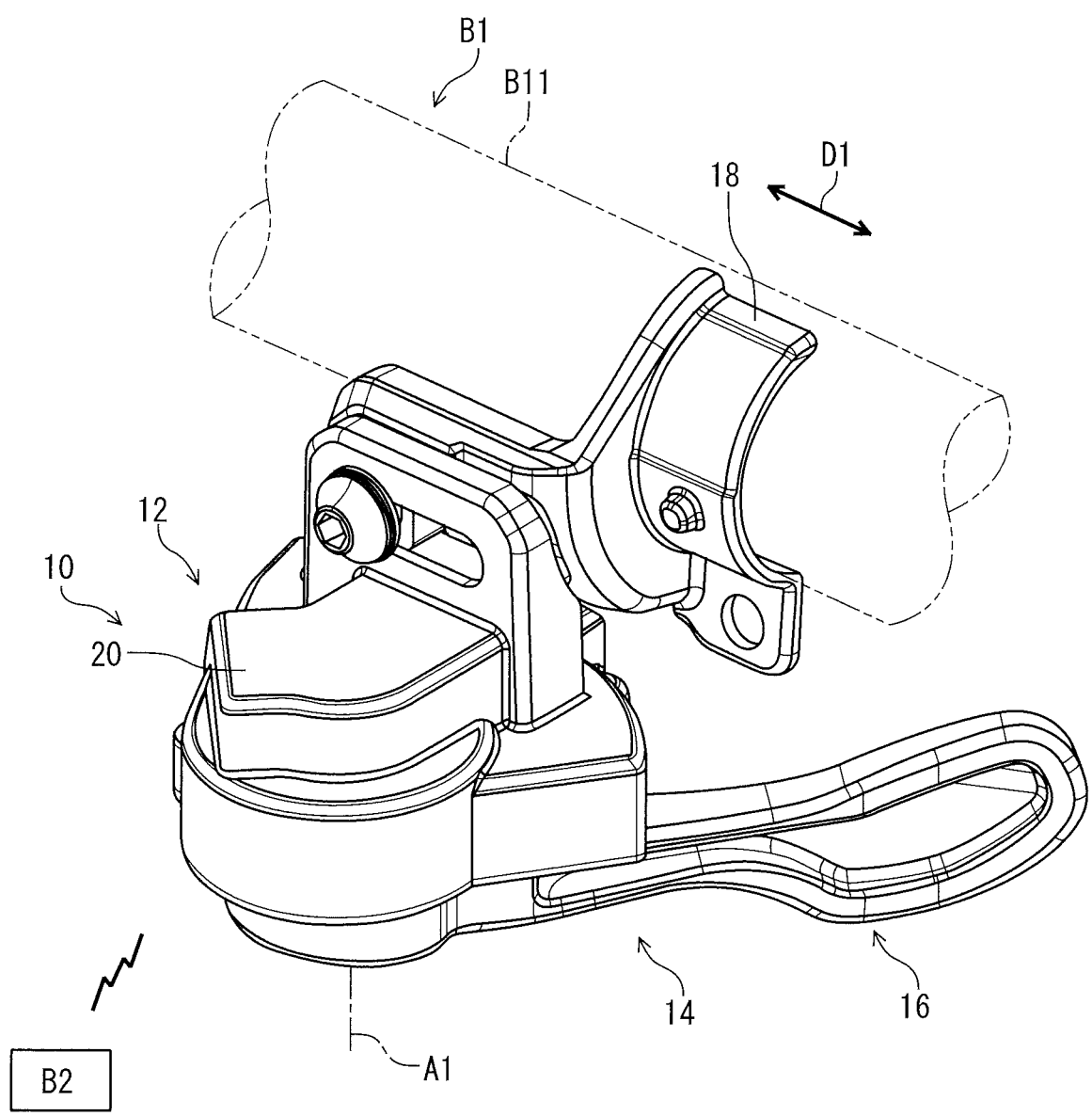
FIG. 1 is a perspective view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle body B1 with a clamping structure of another operating device (not shown). Examples of the bicycle body B1 include a bicycle tube member B11 such as a bicycle handlebar. The bicycle operating device 10 is configured to electrically operate a bicycle component B2. Examples of the bicycle component B2 include an adjustable seatpost assembly, a bicycle shifting device, a suspension, an auxiliary power unit, and an intermediate take-up device.

The bicycle operating device 10 is a left-hand side control device operated by the rider's left hand. It will be apparent to those skilled in the bicycle field that the configuration of the bicycle operating device 10 can be adapted to a right-hand side control device that is operated by the rider's right hand.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the bicycle handlebar. Accordingly, these terms, as utilized to describe the bicycle operating device 10, should be interpreted relative to the bicycle equipped with the bicycle operating device 10 as used in an upright riding position on a horizontal surface.

As seen in FIG. 1, the bicycle operating device 10 comprises a base member 12 and an operating structure 14. The operating structure 14 includes an operating member 16 movably coupled to the base member 12. The operating member 16 is pivotable relative to the base member 12 about a pivot axis A1. The operating member 16 is coupled to the base member 12 to be operated by the user. The base member 12 is configured to be mounted to the bicycle body B1. The base member 12 includes a connector 18 and a first base 20. The connector 18 is coupled to the bicycle body B1 with the clamp structure of the additional operating device (not shown). The first base 20 is movably attached to the connector 18 in a longitudinal direction D1 of the bicycle tube member B11.

Figure 2:
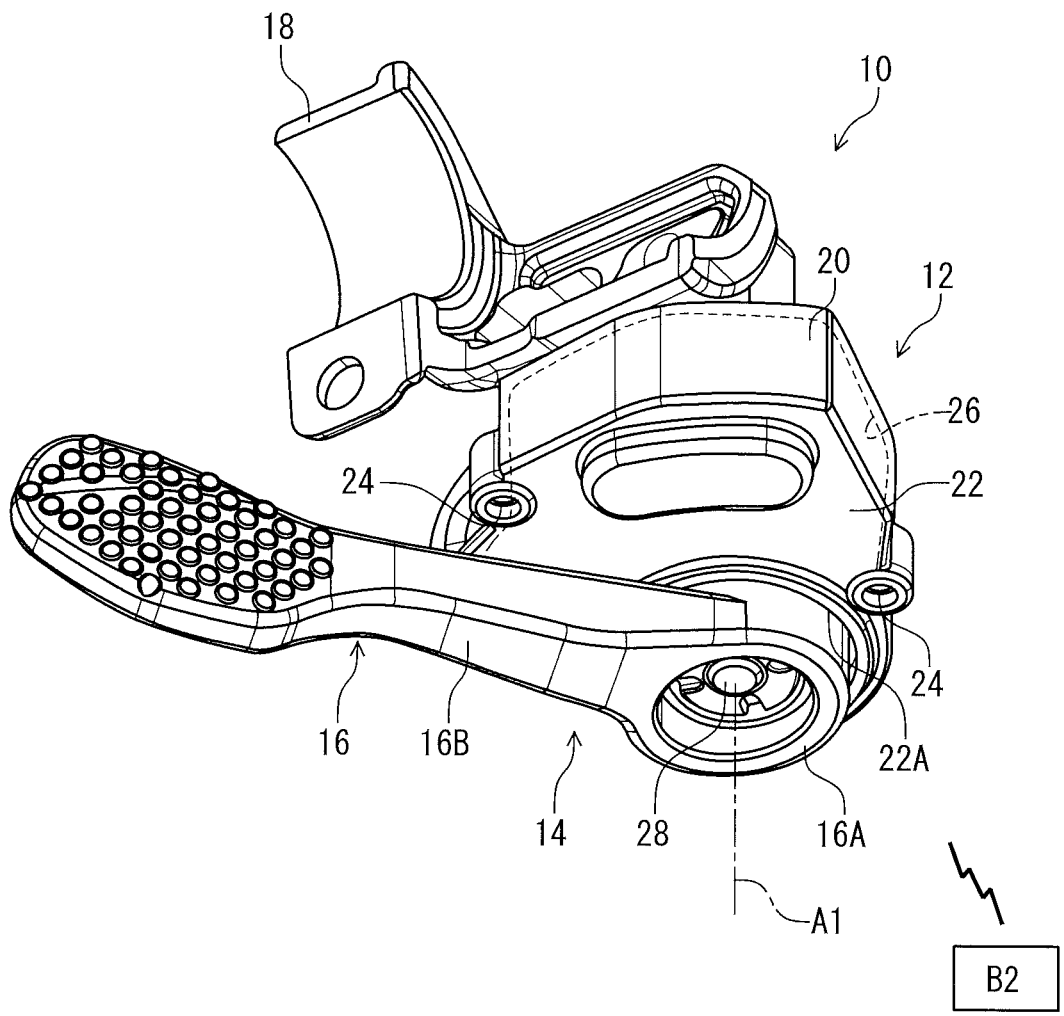
FIG. 2 is another perspective view of the bicycle operating device illustrated in FIG. 1.

As seen in FIG. 2, the base member 12 includes a second base 22. The second base 22 is secured to the first base 20 with fasteners 24 such as screws. The first base 20 and the second base 22 provide an accommodation space 26. The second base 22 includes an opening 22A connected to the accommodation space 26. The bicycle operating device 10 comprises a pivot shaft 28 attached to the base member 12. The operating member 16 includes a coupling body 16A and a lever 16B. The pivot shaft 28 pivotally supports the coupling body 16A about the pivot axis A1. The coupling body 16A extends through the opening 22A of the second base 22. The lever 16B extends radially outwardly from the coupling body 16A. In this embodiment, the lever 16B is integrally provided with the coupling body 16A as a one-piece unitary member. However, the lever 16B can be a separate member from the coupling body 16A.

Figure 3:
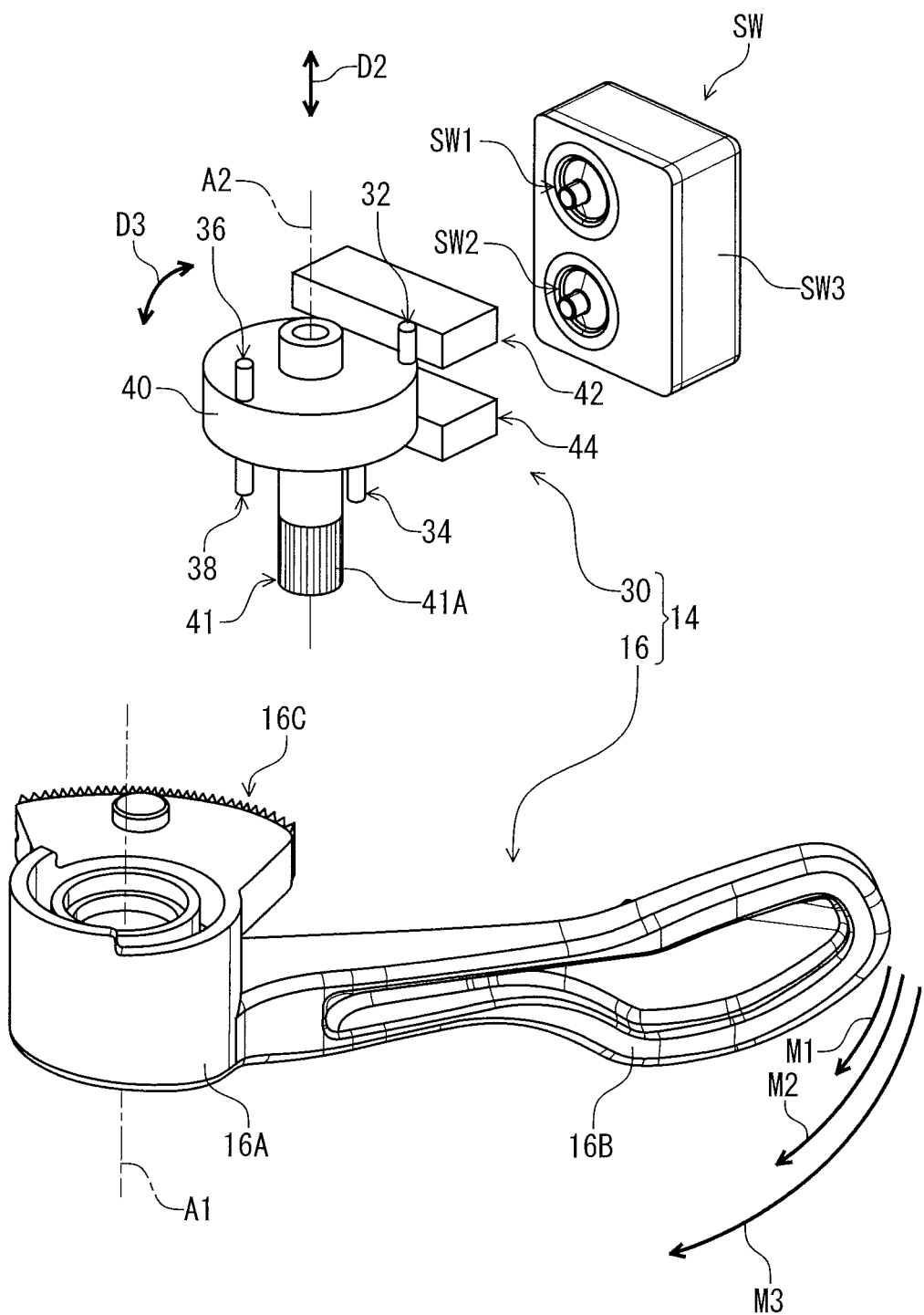
FIG. 3 is an exploded perspective view of an operating structure and a switch structure of the bicycle operating device illustrated in FIG. 1.
Figure 16:
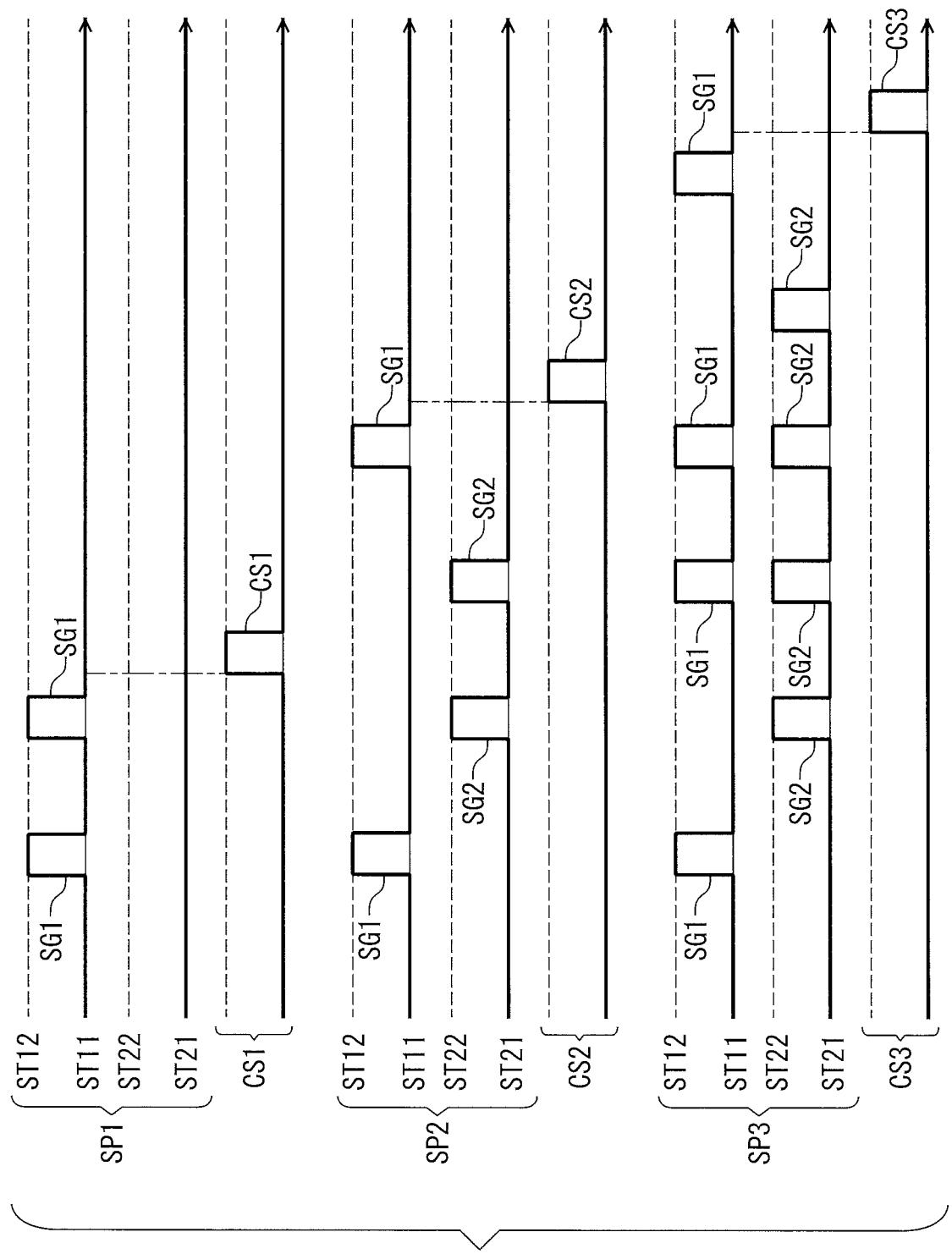
FIG. 16 is a timing chart of the bicycle operating device illustrated in FIG. 1.

As seen in FIG. 3, the bicycle operating device 10 comprises a switch structure SW. The switch structure SW comprises a first electrical switch SW1 and a second electrical switch SW2. The first electrical switch SW1 is configured to generate a first signal SG1 (FIG. 16). The second electrical switch SW2 is configured to generate a second signal SG2 (FIG. 16). In this embodiment, the switch structure SW includes a housing SW3. The housing SW3 is mounted to the base member 12 (FIG. 1). The housing SW3 is provided in the accommodation space 26 (FIG. 2) of the base member 12. The first electrical switch SW1 and the second electrical switch SW2 are mounted to the housing SW3.

Figure 4:
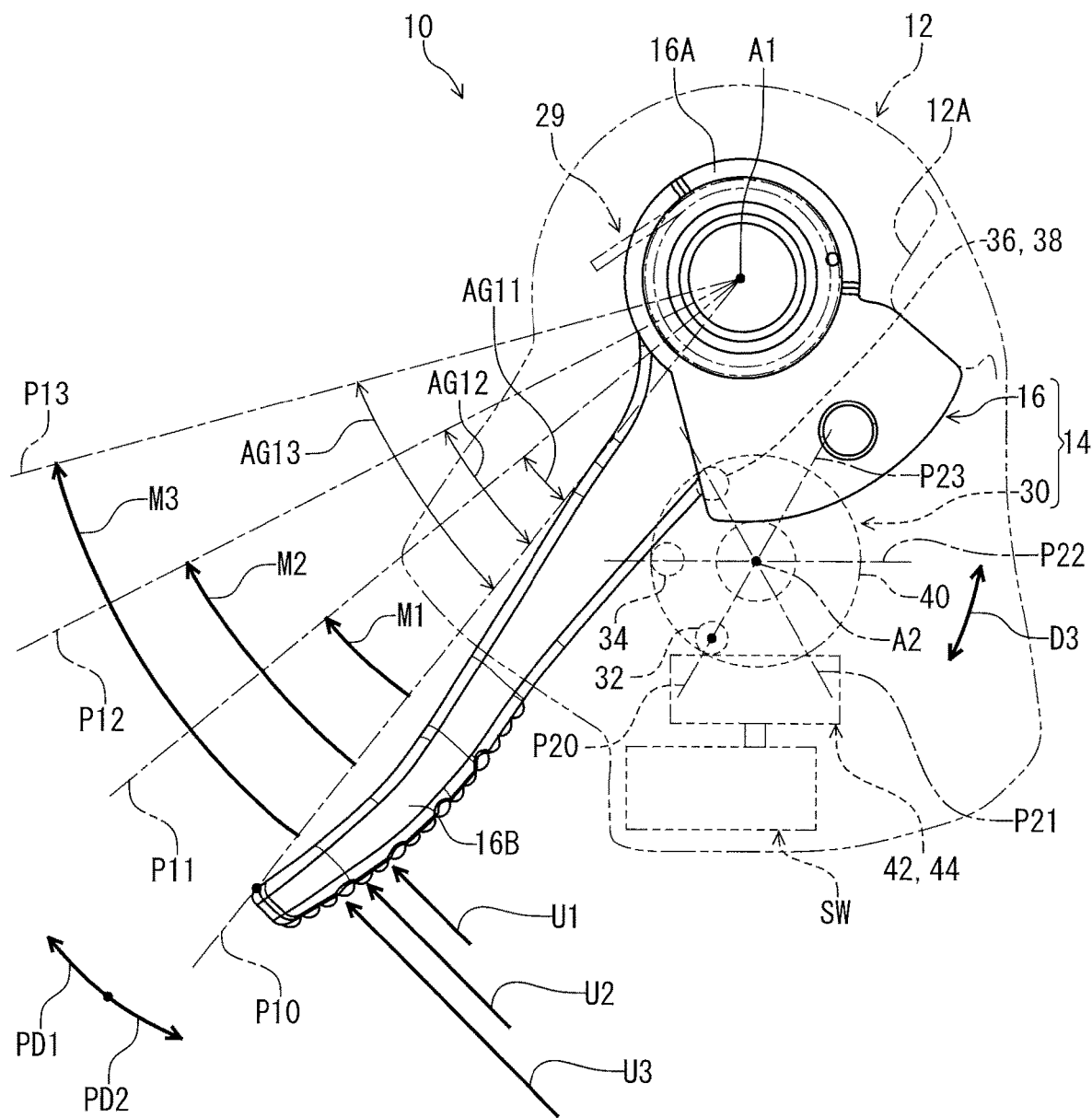
FIG. 4 is a schematic top view of the bicycle operating device illustrated in FIG. 1 (rest position).

As seen in FIG. 4, the operating member 16 is movable relative to the base member 12 in response to a first user input operation U1 to provide a first movement M1. The operating member 16 is movable relative to the base member 12 in response to a second user input operation U2 to provide a second movement M2. The second user input operation U2 is different from the first user input operation U1. The second movement M2 is different from the first movement M1.

The operating member 16 is movable relative to the base member 12 in response to a third user input operation U3 to provide a third movement M3. The third user input operation U3 is different from the first user input operation U1 and the second user input operation U2. However, the third user input operation U3 can be omitted from the bicycle operating device 10.

The operating member 16 is pivotable relative to the base member 12 about the pivot axis A1 from a rest position P10 to a first operated position P11 to provide the first movement M1. The operating member 16 is pivotable relative to the base member 12 about the pivot axis A1 from the rest position P10 to a second operated position P12 through the first operated position P11 to provide the second movement M2. The operating member 16 is pivotable relative to the base member 12 about the pivot axis A1 from the rest position P10 to a third operated position P13 through the first operated position P11 and the second operated position P12 to provide the third movement M3.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

The operating member 16 is pivoted relative to the base member 12 about the pivot axis A1 in a first pivot direction PD1 in response to each of the first user input operation U1, the second user input operation U2, and the third user input operation U3. However, the operating member 16 can be pivoted relative to the base member 12 about the pivot axis A1 in a second pivot direction PD2 opposite to the first pivot direction PD1 in response to at least one of the first user input operation U1, the second user input operation U2, and the third user input operation U3.

The base member 12 includes a stopper 12A. The stopper 12A is contactable with the operating member 16 to position the operating member 16 in the rest position P10. The bicycle operating device 10 comprises a biasing member 29. The biasing member 29 is coupled to the operating member 16 to bias the operating member 16 toward the rest position P10 relative to the base member 12. The biasing member 29 is coupled to the operating member 16 to press the operating member 16 against the stopper 12A. Thus, the operating member 16 is positioned in the rest position P10 in a state where the operating member 16 is not operated by the user. In this embodiment, the biasing member 29 includes a torsion spring. However, the biasing member 29 can include another member instead of or in addition to the torsion spring.

The first movement M1 has a first amount of movement of the operating member 16. The second movement M2 has a second amount of movement of the operating member 16. The third movement M3 has a third amount of movement of the operating member 16. The second amount of movement is different from the first amount of movement. The third amount of movement is different from the first amount of movement and the second amount of movement.

In this embodiment, the first movement M1 includes a first pivotal movement having a first pivot angle AG11 corresponding to the first amount of movement. The second movement M2 includes a second pivotal movement having a second pivot angle AG12 corresponding to the second amount of movement. The third movement M3 includes a third pivotal movement having a third pivot angle AG13 corresponding to the third amount of movement. The second pivot angle AG12 is different from the first pivot angle AG11. The third pivot angle AG13 is different from the first pivot angle AG11 and the second pivot angle AG12. However, at least one of the first to third pivot angles AG11 to AG13 can be equal to another of the first to third pivot angles AG11 to AG13. For example, the second pivot angle AG12 can be equal to the first pivot angle AG11 in a case where the operating member 16 is pivoted relative to the base member 12 about the pivot axis A1 in the second pivot direction PD2 in response to the second user input operation U2.

The first pivot angle AG11 is provided about the pivot axis A1 between the rest position and the first operated position P11. The second pivot angle AG12 is provided about the pivot axis A1 between the rest position P10 and the second operated position P12. The third pivot angle AG13 is provided about the pivot axis A1 between the rest position P10 and the third operated position P13. In this embodiment, the second amount of movement is greater than the first amount of movement. The third amount of movement is greater than the first amount of movement and the second amount of movement. Namely, the second pivot angle AG12 is larger than the first pivot angle AG11. The third pivot angle AG13 is larger than the first pivot angle AG11 and the second pivot angle AG12. However, the second amount of movement can be less than the first amount of movement. The third amount of movement can be less than at least one of the first amount of movement and the second amount of movement. The second pivot angle AG12 can be smaller than the first pivot angle AG11. The third pivot angle AG13 can be smaller than at least one of the first pivot angle AG11 and the second pivot angle AG12.

As seen in FIG. 3, the operating structure 14 includes an intermediate structure 30. The intermediate structure 30 is provided between the operating member 16 and the switch structure SW to transmit each of the first movement M1 and the second movement M2 to the switch structure SW. In this embodiment, the intermediate structure 30 is provided between the operating member 16 and the switch structure SW to transmit each of the first movement M1, the second movement M2, and the third movement M3 to the switch structure SW.

The intermediate structure 30 includes a first cam 32 and a second cam 34. The first cam 32 is movable relative to the base member 12 to press the first electrical switch SW1 in response to at least one of the first movement M1 and the second movement M2. The second cam 34 is movable relative to the base member 12 to press the second electrical switch SW2 in response to at least one of the first movement M1 and the second movement M2.

In this embodiment, the first cam 32 is movable relative to the base member 12 to press the first electrical switch SW1 in response to the first movement M1. The second cam 34 is movable relative to the base member 12 to press the second electrical switch SW2 in response to the second movement M2. However, the first cam 32 can be configured to press the first electrical switch SW1 in response to the second movement M2 or both the first movement M1 and the second movement M2. The second cam 34 can be configured to press the second electrical switch SW2 in response to the first movement M1 or both the first movement M1 and the second movement M2.

The intermediate structure 30 includes a third cam 36 and a fourth cam 38. The third cam 36 is movable relative to the base member 12 to press the first electrical switch SW1 in response to at least one of the first movement M1, the second movement M2, and the third movement M3. The fourth cam 38 is movable relative to the base member 12 to press the second electrical switch SW2 in response to at least one of the first movement M1, the second movement M2, and the third movement M3.

In this embodiment, the third cam 36 is movable relative to the base member 12 to press the first electrical switch SW1 in response to the third movement M3. The fourth cam 38 is movable relative to the base member 12 to press the second electrical switch SW2 in response to the third movement M3. However, the third cam 36 can be configured to press the first electrical switch SW1 in response to a movement other than the third movement M3. The fourth cam 38 is movable relative to the base member 12 to press the second electrical switch SW2 in response to a movement other than the third movement M3.

The intermediate structure 30 includes a rotatable member 40. The rotatable member 40 is rotatably coupled to the base member 12 (FIG. 4) about a rotational axis A2. The first cam 32 and the second cam 34 are coupled to the rotatable member 40 to rotate relative to the base member 12 (FIG. 4) along with the rotatable member 40 about the rotational axis A2. The third cam 36 and the fourth cam 38 are coupled to the rotatable member 40 to rotate relative to the base member 12 (FIG. 4) along with the rotatable member 40 about the rotational axis A2. However, at least one of the first to fourth cams 32, 34, 36, and 38 can be configured to be movable in a direction other than the rotational direction.

The intermediate structure 30 includes a support tube 41. The support tube 41 is secured to the rotatable member 40 and extends along the rotational axis A2. The support tube 41 includes a first gear 41A. The operating member 16 includes a second gear 16C. The second gear 16C meshes with the first gear 41A to transmit a pivotal movement of the operating member 16 to the support tube 41. Thus, the rotatable member 40 is rotated relative to the base member 12 (FIG. 4) about the rotational axis A2 in response to each of the first movement M1, the second movement M2, and the third movement M3 of the operating member 16.

Figure 5:
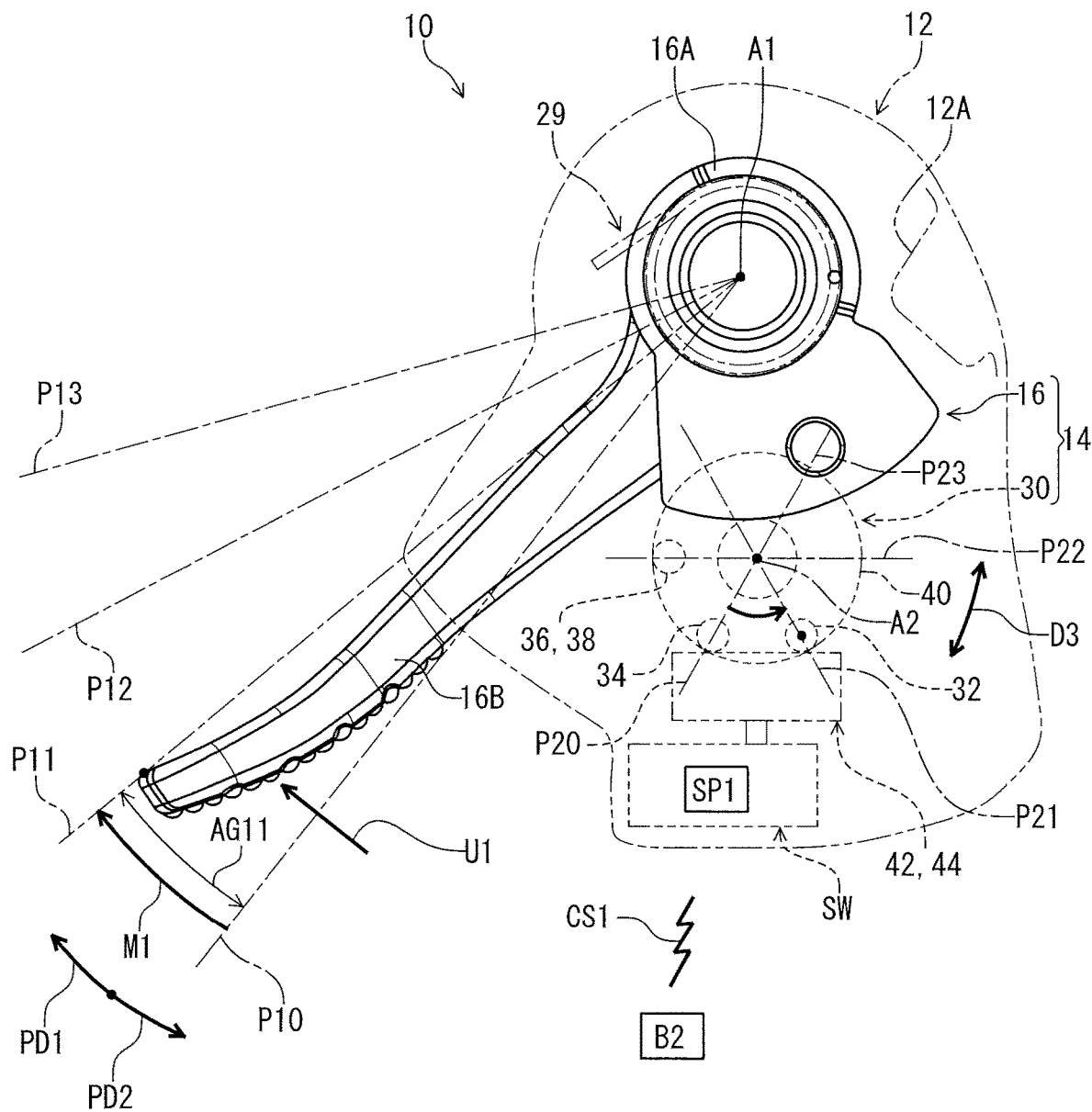
FIG. 5 is a schematic top view of the bicycle operating device illustrated in FIG. 1 (first operated position).

As seen in FIG. 5, the rotatable member 40 is rotated relative to the base member 12 from a rotational rest position P20 to a first rotational position P21 when the operating member 16 is pivoted by the user relative to the base member 12 from the rest position P10 to the first operated position P11 (the first user input operation U1). The operating member 16 is returned from the first operated position P11 to the rest position P10 with a biasing force of the biasing member 29 when the operating member 16 is released by the user. The rotatable member 40 is retuned from the first rotational position P21 to the rotational rest position P20 when the operating member 16 is returned from the first operated position P11 to the rest position P10.

Figure 6:
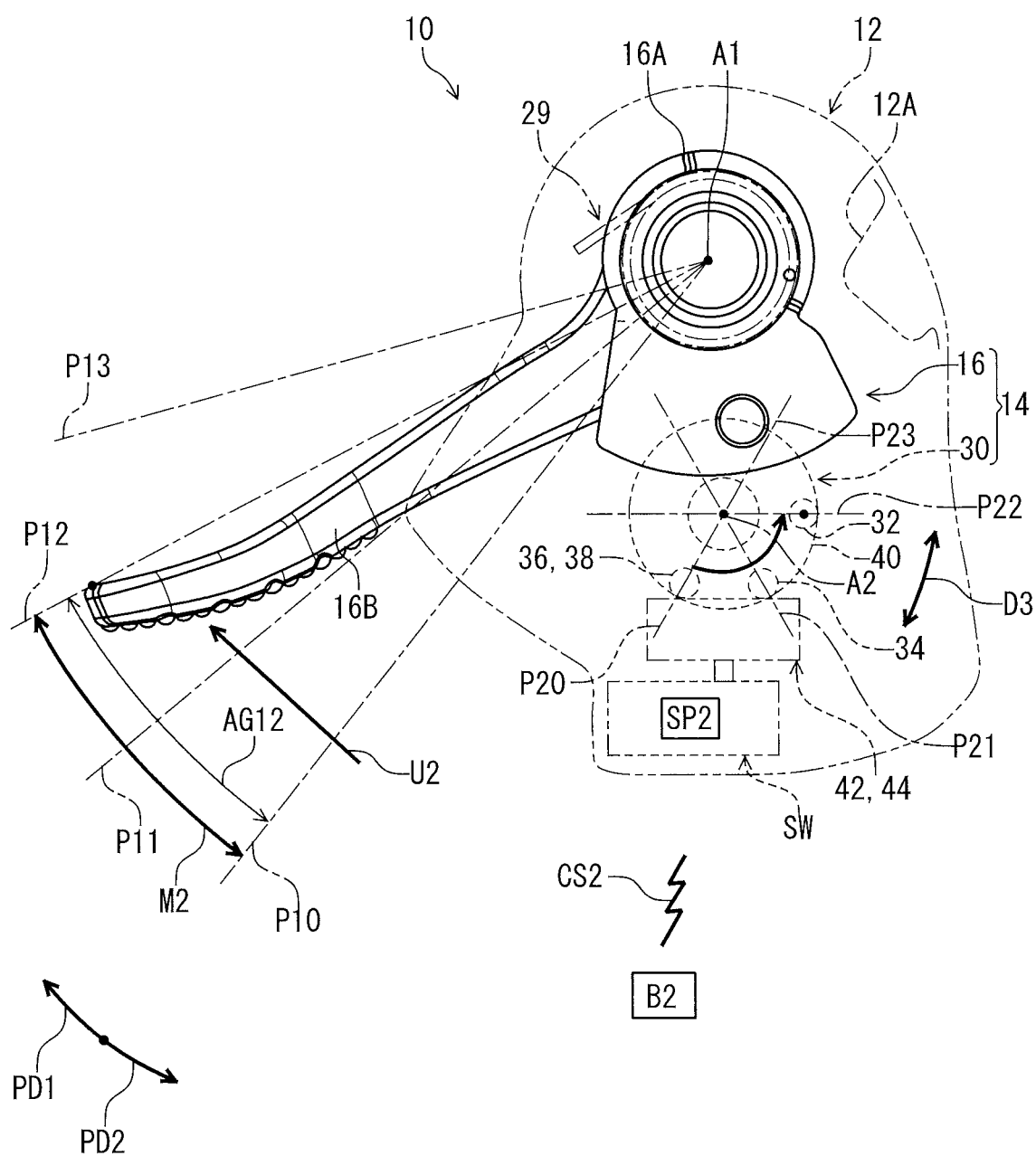
FIG. 6 is a schematic top view of the bicycle operating device illustrated in FIG. 1 (second operated position).

As seen in FIG. 6, the rotatable member 40 is rotated relative to the base member 12 from the rotational rest position P20 to a second rotational position P22 when the operating member 16 is pivoted by the user relative to the base member 12 by from the rest position P10 to the second operated position P12 (the second user input operation U2). The operating member 16 is returned from the second operated position P12 to the rest position P10 with the biasing force of the biasing member 29 when the operating member 16 is released by the user. The rotatable member 40 is retuned from the second rotational position P22 to the rotational rest position P20 when the operating member 16 is returned from the second operated position P12 to the rest position P10.

Figure 7:
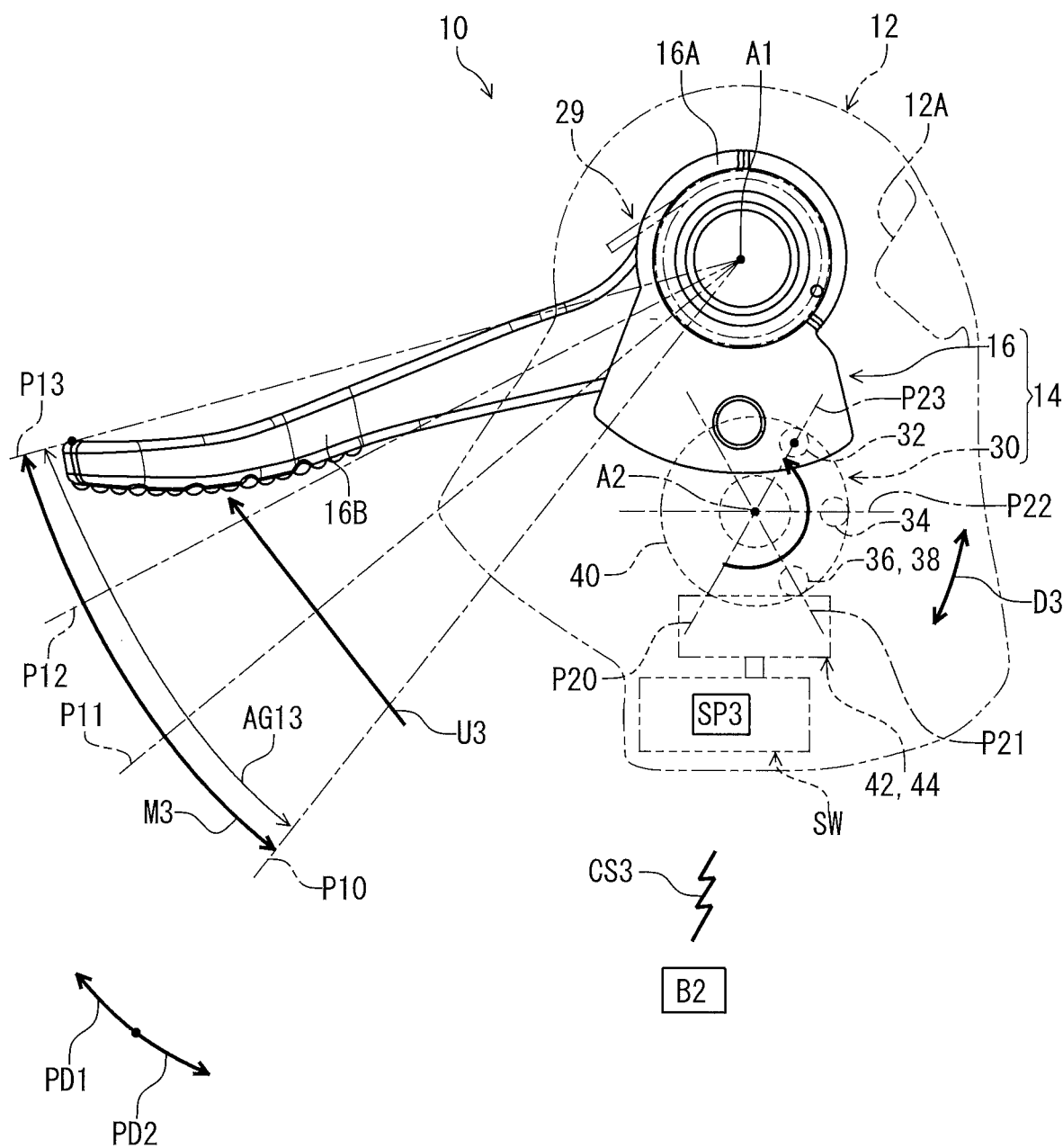
FIG. 7 is a schematic top view of the bicycle operating device illustrated in FIG. 1 (third operated position).

As seen in FIG. 7, the rotatable member 40 is rotated relative to the base member 12 from the rotational rest position P20 to a third rotational position P23 when the operating member 16 is pivoted by the user relative to the base member 12 by from the rest position P10 to the third operated position P13 (the third user input operation U3). The operating member 16 is returned from the third operated position P13 to the rest position P10 with the biasing force of the biasing member 29 when the operating member 16 is released by the user. The rotatable member 40 is retuned from the third rotational position P23 to the rotational rest position P20 when the operating member 16 is returned from the third operated position P13 to the rest position P10.

In this embodiment, the rotational rest position P20, the first rotational position P21, the second rotational position P22, and the third rotational position P23 are defined based on the first cam 32. However, the rotational rest position P20, the first rotational position P21, the second rotational position P22, and the third rotational position P23 can be defined based on another member such as the rotatable member 40, the second cam 34, the third cam 36, and the fourth cam 38.

Figure 8:
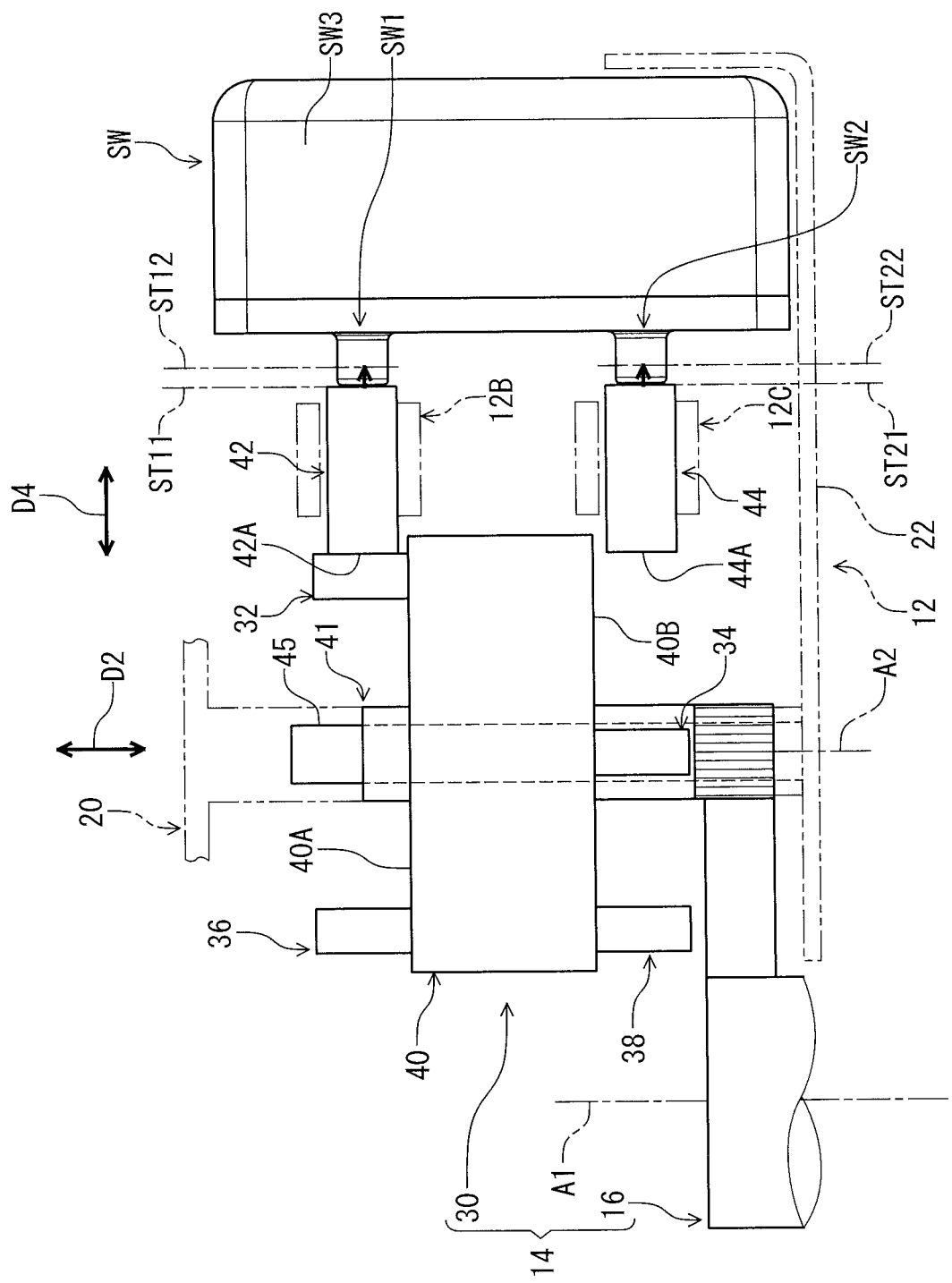
FIG. 8 is a side elevational view of the operating structure and the switch structure of the bicycle operating device illustrated in FIG. 1.

As seen in FIG. 8, the rotatable member 40 includes a first surface 40A and a second surface 40B. The second surface 40B is provided on a reverse side of the first surface 40A in an axial direction D2 of the rotational axis A2. The first cam 32 and the third cam 36 are provided on the first surface 40A. The second cam 34 and the fourth cam 38 are provided on the second surface 40B. The first cam 32 and the third cam 36 extend from the first surface 40A in the axial direction D2. The second cam 34 and the fourth cam 38 extend from the second surface 40B in the axial direction D2.

Figure 9:
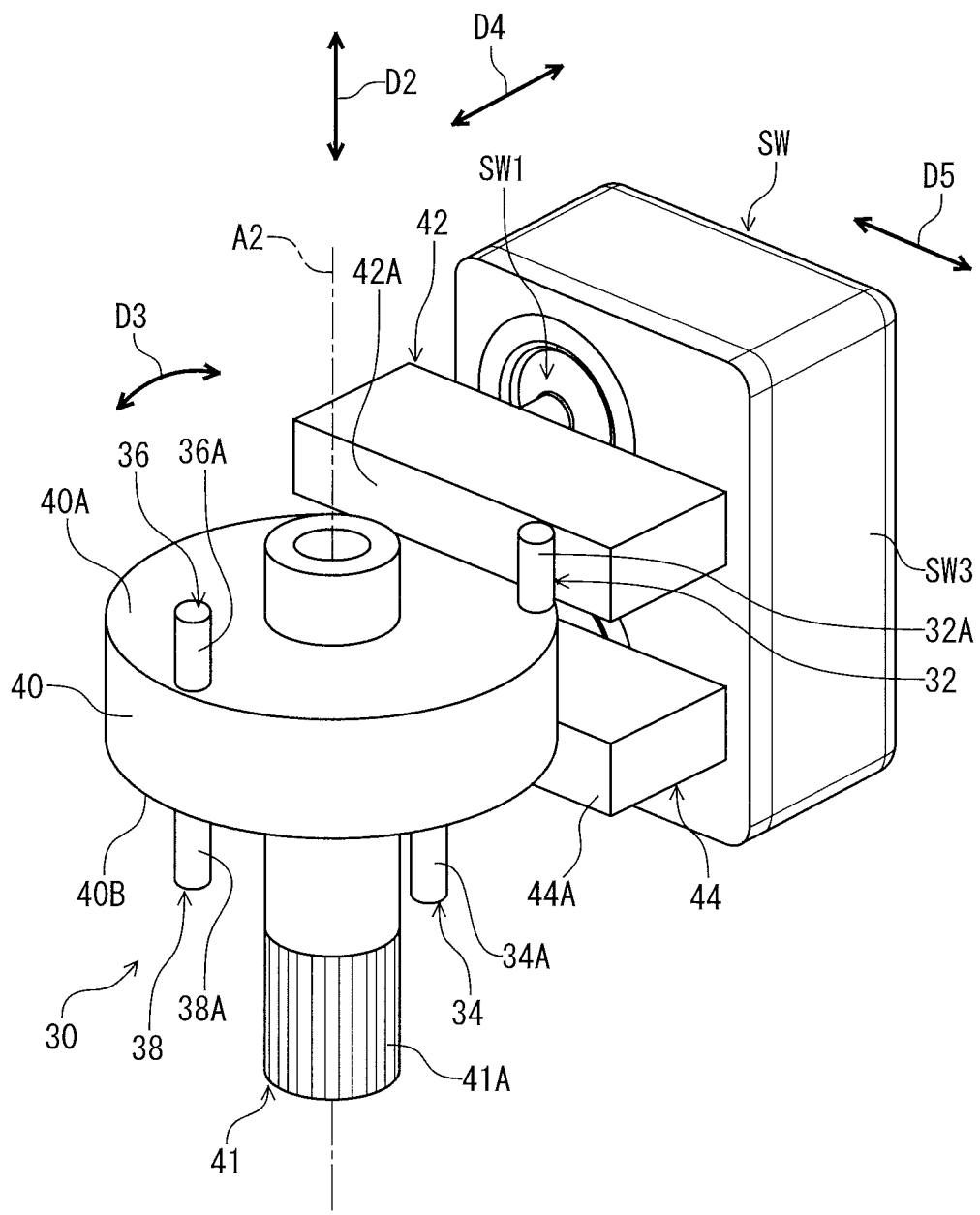
FIG. 9 is a partial exploded perspective view of the operating structure and the switch structure of the bicycle operating device illustrated in FIG. 1.

As seen in FIGS. 4 and 9, the second cam 34 is offset from the first cam 32 in a rotational direction D3 of the rotatable member 40. The third cam 36 is offset from the first cam 32 and the second cam 34 in the rotational direction D3. The fourth cam 38 is offset from the first cam 32 and the second cam 34 in the rotational direction D3. The fourth cam 38 is provided at a circumferential position equal to a circumferential position of the third cam 36 in the rotational direction D3. The first cam 32, the second cam 34, the third cam 36, and the fourth cam 38 are provided at substantially the same radial position as each other.

As seen in FIG. 9, the first cam 32 includes a first curved surface 32A. The second cam 34 includes a second curved surface 34A. The third cam 36 includes a third curved surface 36A. The fourth cam 38 includes a fourth curved surface 38A. In this embodiment, each of the first cam 32, the second cam 34, the third cam 36, and the fourth cam 38 has a columnar shape. However, the shape of each of the first to fourth cams 32 to 38 is not limited to this embodiment.

As seen in FIGS. 8 and 9, the intermediate structure 30 includes a first follower 42 and a second follower 44. The first follower 42 and second follower 44 are arranged in the axial direction D2 of the rotational axis A2. The first follower 42 is provided between the first cam 32 and the first electrical switch SW1 to be contactable with the first cam 32. The second follower 44 is provided between the second cam 34 and the second electrical switch SW2 to be contactable with the second cam 34. The first follower 42 is provided between the third cam 36 and the first electrical switch SW1 to be contactable with the third cam 36. The second follower 44 is provided between the fourth cam 38 and the second electrical switch SW2 to be contactable with the fourth cam 38. The first follower 42 includes a first contact surface 42A contactable with each of the first cam 32 and the third cam 36 (each of the first curved surface 32A and the third curved surface 36A). The second follower 44 includes a second contact surface 44A contactable with each of the second cam 34 and the fourth cam 38 (each of the second curved surface 34A and the fourth curved surface 38A).

The base member 12 movably supports the first follower 42 and the second follower 44 in a movement direction D4. The movement direction D4 is perpendicular to the rotational axis A2 of the rotatable member 40. The rotatable member 40 is spaced apart from the switch structure SW in the movement direction D4.

As seen in FIG. 8, the base member 12 includes a first support 12B and a second support 12C. The first support 12B and the second support 12C are secured to the first base 20 (FIG. 1). The first support 12B movably supports the first follower 42 in the movement direction D4. The second support 12C movably supports the second follower 44 in the movement direction D4. The first support 12B restricts a movement of the first follower 42 relative to the base member 12 in a restriction direction D5 (FIG. 9). The second support 12C restricts a movement of the second follower 44 relative to the base member 12 in the restriction direction D5 (FIG. 9). The restriction direction D5 is perpendicular to the axial direction D2 and the movement direction D4.

As seen in FIG. 8, the bicycle operating device 10 comprises a rotational shaft 45. The rotational shaft 45 is secured to the second base 22 and extends from the second base 22 in the axial direction D2. The rotational shaft 45 extends through the rotatable member 40 and the support tube 41 to rotatably couple the rotatable member 40 and the support tube 41 to the base member 12. The rotational shaft 45 is secured to the first base 20. The rotatable member 40 and the support tube 41 are provided between the first base 20 and the second base 22 in the axial direction D2. The first base 20 and the second base 22 restrict an axial movement of the rotatable member 40.

Figure 10:
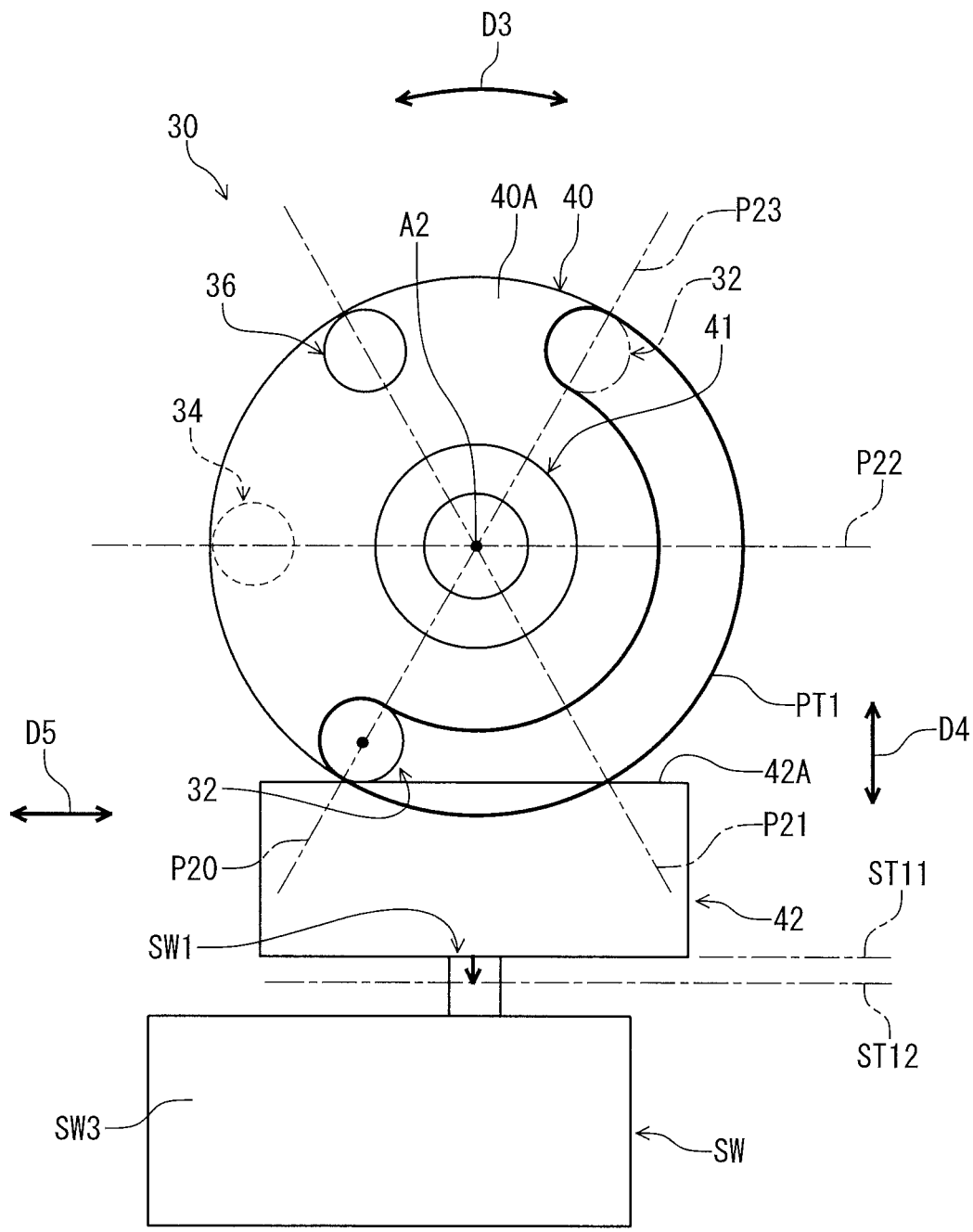
FIG. 10 is a schematic view showing a first path of a first cam of the bicycle operating device illustrated in FIG. 1.

As seen in FIG. 10, the first cam 32 is rotatable relative to the base member 12 on a first path PT1 in response to a rotation of the rotatable member 40. The first follower 42 is provided on the first path PT1 to be contactable with the first cam 32. The first contact surface 42A is at least partly provided on the first path PT1 to be contactable with the first cam 32.

Figure 11:
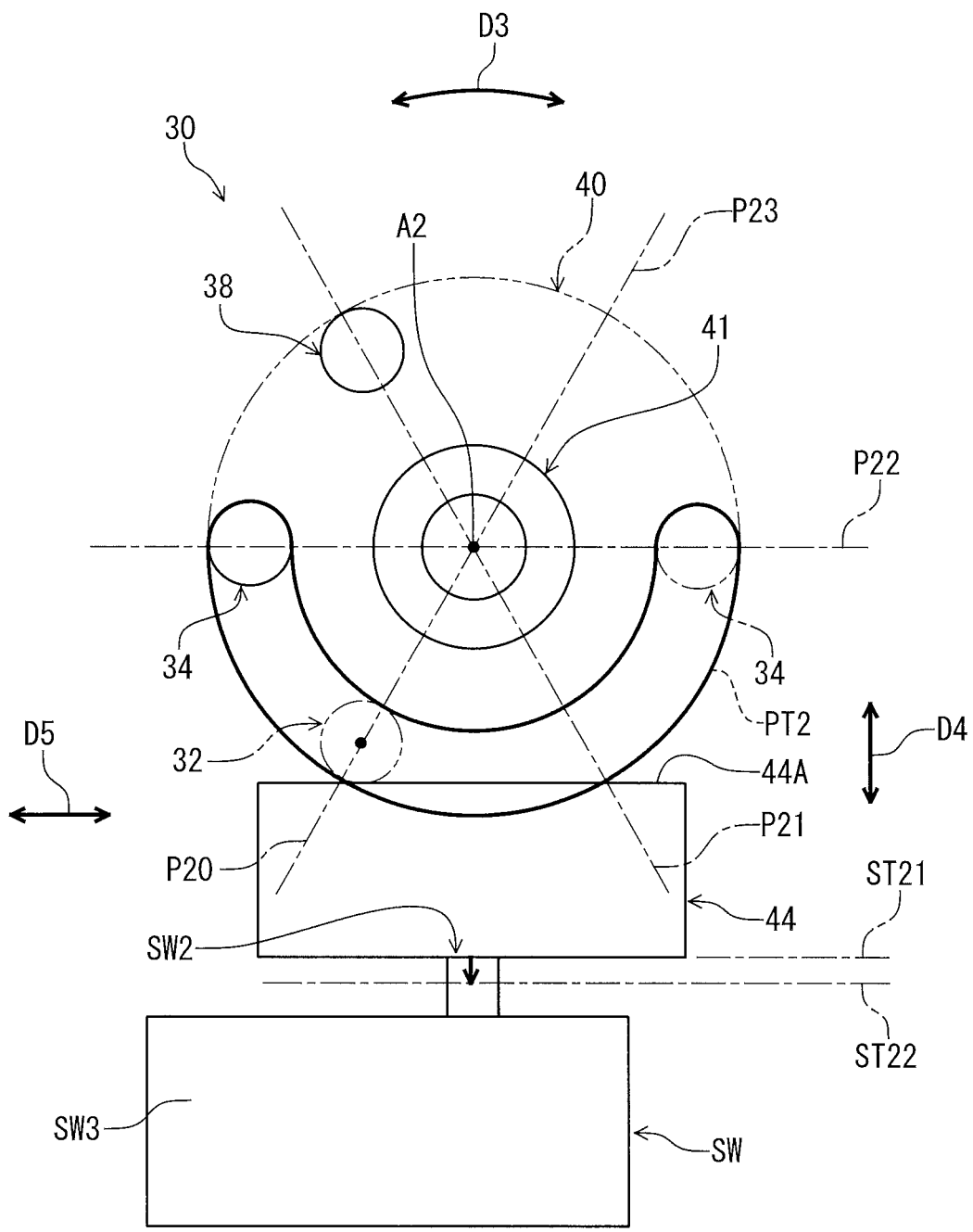
FIG. 11 is a schematic view showing a second path of a second cam of the bicycle operating device illustrated in FIG. 1.

As seen in FIG. 11, the second cam 34 is rotatable relative to the base member 12 on a second path PT2 in response to a rotation of the rotatable member 40. The second follower 44 is provided on the second path PT2 to be contactable with the second cam 34. The second contact surface 44A is at least partly provided on the second path PT2 to be contactable with the second cam 34.

Figure 12:
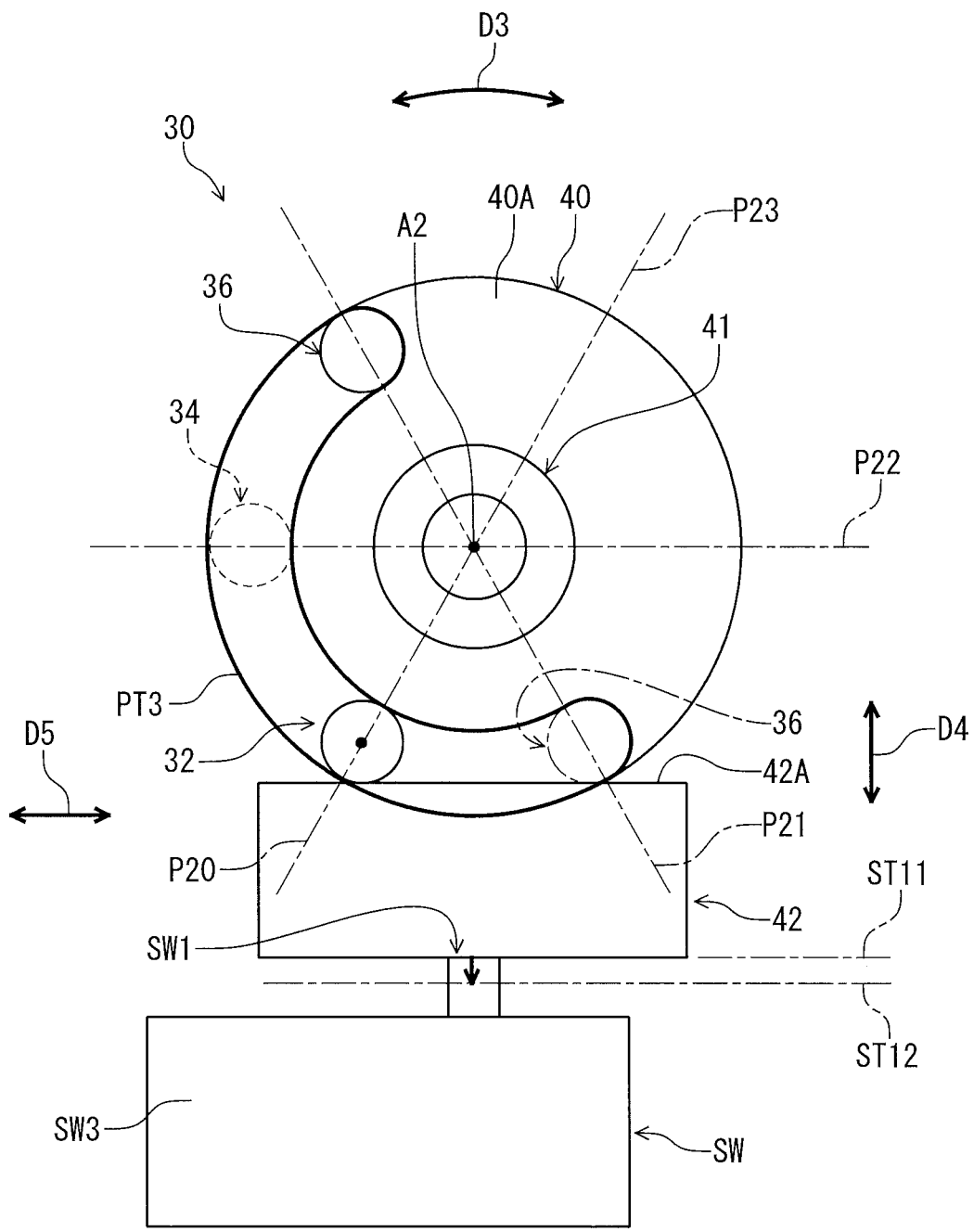
FIG. 12 is a schematic view showing a third path of a third cam of the bicycle operating device illustrated in FIG. 1.

As seen in FIG. 12, the third cam 36 is rotatable relative to the base member 12 on a third path PT3 in response to a rotation of the rotatable member 40. The first follower 42 is provided on the third path PT3 to be contactable with the third cam 36. The first contact surface 42A is at least partly provided on the third path PT3 to be contactable with the third cam 36.

Figure 13:
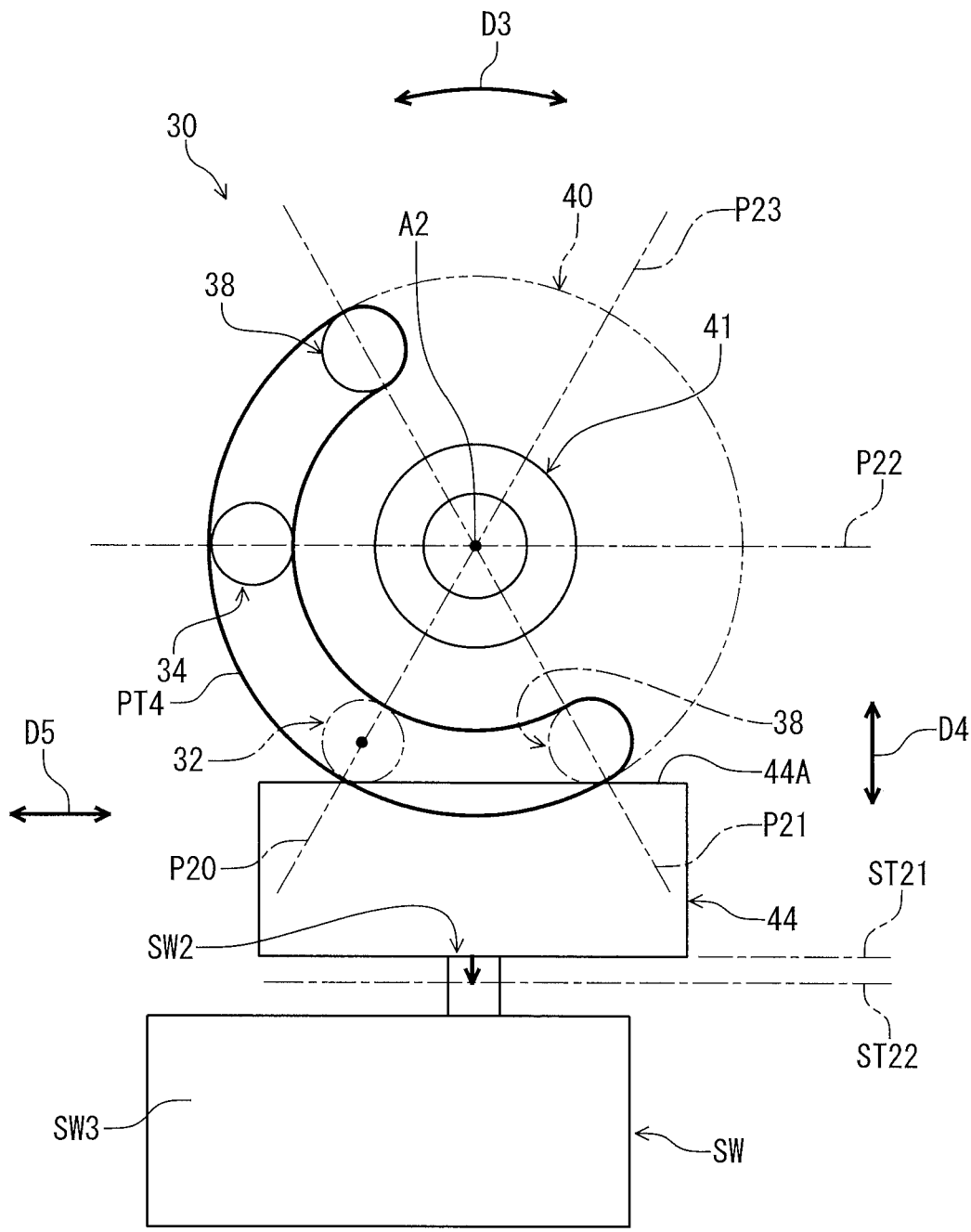
FIG. 13 is a schematic view showing a fourth path of a fourth cam of the bicycle operating device illustrated in FIG. 1.

As seen in FIG. 13, the fourth cam 38 is rotatable relative to the base member 12 on a fourth path PT4 in response to a rotation of the rotatable member 40. The second follower 44 is provided on the fourth path PT4 to be contactable with the fourth cam 38. The second contact surface 44A is at least partly provided on the fourth path PT4 to be contactable with the fourth cam 38.

As seen in FIGS. 10 and 12, the first electrical switch SW1 has a first operated state. The first operated state has a first OFF state ST11 and a first ON state ST12 to generate the first signal SG1 (FIG. 16). As seen in FIGS. 11 and 13, the second electrical switch SW2 has a second operated state. The second operated state has a second OFF state ST21 and a second ON state ST22 to generate the second signal SG2 (FIG. 16).

Figure 14:
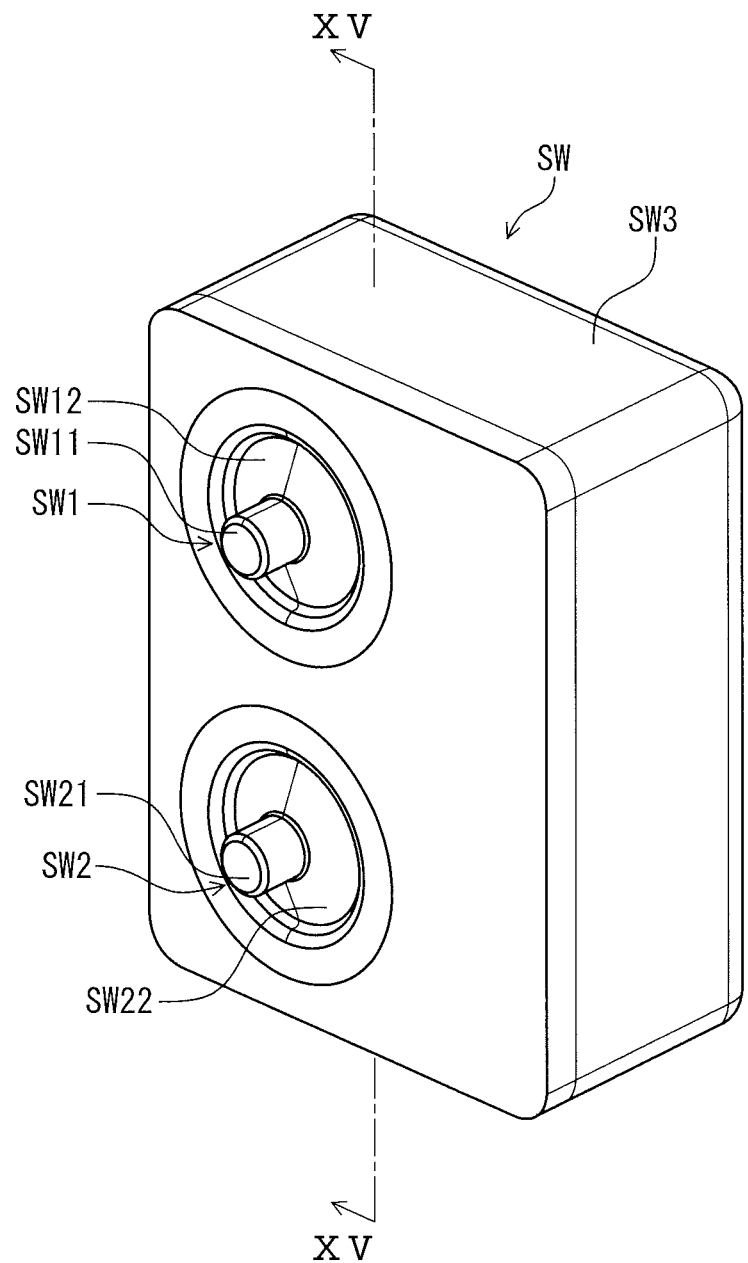
FIG. 14 is a perspective view of the switch structure of the bicycle operating device illustrated in FIG. 1.
Figure 15:
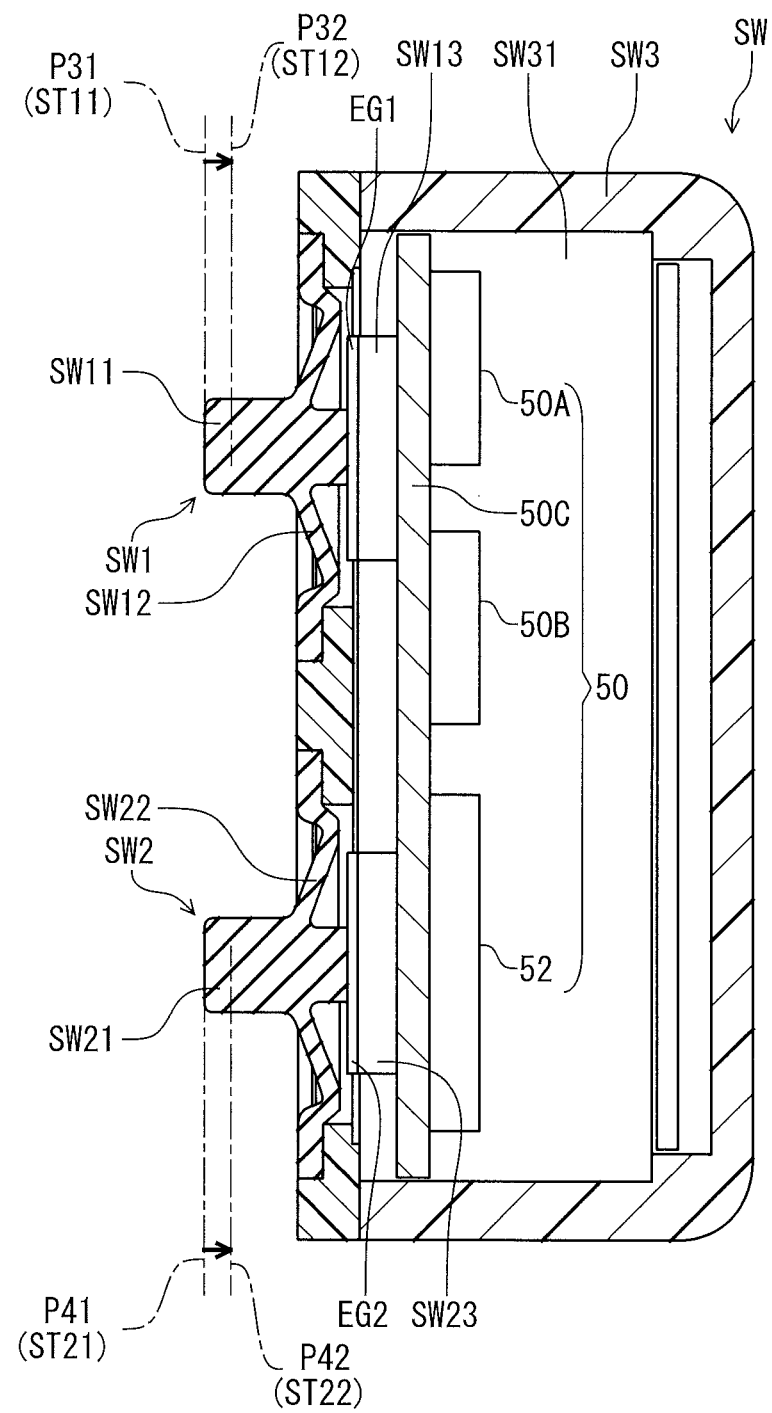
FIG. 15 is a cross-sectional view of the switch structure taken along line XV-XV of FIG. 14.

As seen in FIGS. 14 and 15, the first electrical switch SW1 includes a first input member SW11, a first elastic part SW12, and a first switch circuit SW13. The first input member SW11 is movably coupled to the housing SW3 from a first rest position P31 to a first operated position P32. The first elastic part SW12 movably couples the first input member SW11 to the housing SW3. The first switch circuit SW13 includes a normally-open switch circuit. However, the first switch circuit SW13 can include a normally-close switch circuit. The first switch circuit SW13 is turned off in the first OFF state ST11 where the first input member SW11 is in the first rest position P31. The first switch circuit SW13 is turned on to generate the first signal SG1 in the first ON state ST12 where the first input member SW11 is in the first operated position P32. The first switch circuit SW13 is provided in an interior space SW31 of the housing SW3. In this embodiment, the first electrical switch SW1 is a contact switch. However, the first electrical switch SW1 can be a non-contact switch such as a hall switch.

The second electrical switch SW2 includes a second input member SW21, a second elastic part SW22, and a second switch circuit SW23. The second input member SW21 is movably coupled to the housing SW3 from a second rest position P41 to a second operated position P42. The second elastic part SW22 movably couples the second input member SW21 to the housing SW3. The second switch circuit SW23 includes a normally-open switch circuit. However, the first switch circuit SW13 can include a normally-close switch circuit. The second switch circuit SW23 is turned off in the second OFF state ST21 where the second input member SW21 is in the second rest position P41. The second switch circuit SW23 is turned on to generate the second signal SG2 in the second ON state ST22 where the second input member SW21 is in the second operated position P42. The second switch circuit SW23 is provided in the interior space SW31 of the housing SW3. In this embodiment, the second electrical switch SW2 is a contact switch. However, the second electrical switch SW2 can be a non-contact switch such as a hall switch.

As seen in FIG. 5, the operating structure 14 is operatively coupled to the switch structure SW to generate a first signal pattern SP1 in response to the first user input operation U1. As seen in FIG. 6, the operating structure 14 is operatively coupled to the switch structure SW to generate a second signal pattern SP2 in response to the second user input operation U2. As seen in FIG. 7, the operating structure 14 is operatively coupled to the switch structure SW to generate a third signal pattern SP3 in response to the third user input operation U3.

As seen in FIG. 16, the second signal pattern SP2 is different from the first signal pattern SP1. The third signal pattern SP1 is different from the first signal pattern SP1 and the second signal pattern SP2. The first signal pattern SP1 includes at least one of the first signal SG1 and the second signal SG2. The second signal pattern SP2 includes at least one of the first signal SG1 and the second signal SG2. The third signal pattern SP3 includes at least one of the first signal SG1 and the second signal SG2.

In this embodiment, the first signal pattern SP1 includes only the first signal SG1. The second signal pattern SP2 includes both the first signal SG1 and the second signal SG2. The third signal pattern SP3 includes both the first signal SG1 and the second signal SG2. However, the first signal pattern SP1 can include only the second signal SG2 or both the first signal SG1 and the second signal SG2. The second signal pattern SP2 can include only one of the first signal SG1 and the second signal SG2. The third signal pattern SP3 can include only one of the first signal SG1 and the second signal SG2.

The first signal pattern SP1 includes a first combination of the first operated state and the second operated state. The second signal pattern SP2 includes a second combination of the first operated state and the second operated state. The third signal pattern SP3 includes a third combination of the first operated state and the second operated state. The second combination is different from the first combination. The third combination is different from the first combination and the second combination.

In this embodiment, the first signal pattern SP1 includes the first combination of the first signal SG1 and the second signal SG2. The first signal pattern SP1 includes a combination of the first OFF state ST11, the first ON state ST12, and the second OFF state ST21. The first signal pattern SP1 includes the first signal SG1 and the first signal SG1 in this order. The first signal pattern SP1 is not limited to this embodiment.

The second signal pattern SP2 includes the second combination of the first signal SG1 and the second signal SG2. The second signal pattern SP2 includes a combination of the first OFF state ST11, the first ON state ST12, the second OFF state ST21, and the second ON state ST22. The second signal pattern SP2 includes the first signal SG1, the second signal SG2, the second signal SG2, and the first signal SG1 in this order. The second signal pattern SP2 is not limited to this embodiment.

The third signal pattern SP3 includes the third combination of the first signal SG1 and the second signal SG2. The third signal pattern SP3 includes a combination of the first OFF state ST11, the first ON state ST12, the second OFF state ST21, and the second ON state ST22. The third signal pattern SP3 includes the first signal SG1, the second signal SG2, the first and second signals SG1 and SG2, the first and second signals SG1 and SG2, the second signal SG2, and the first signal SG1 in this order. The third signal pattern SP3 is not limited to this embodiment.

Figure 17:
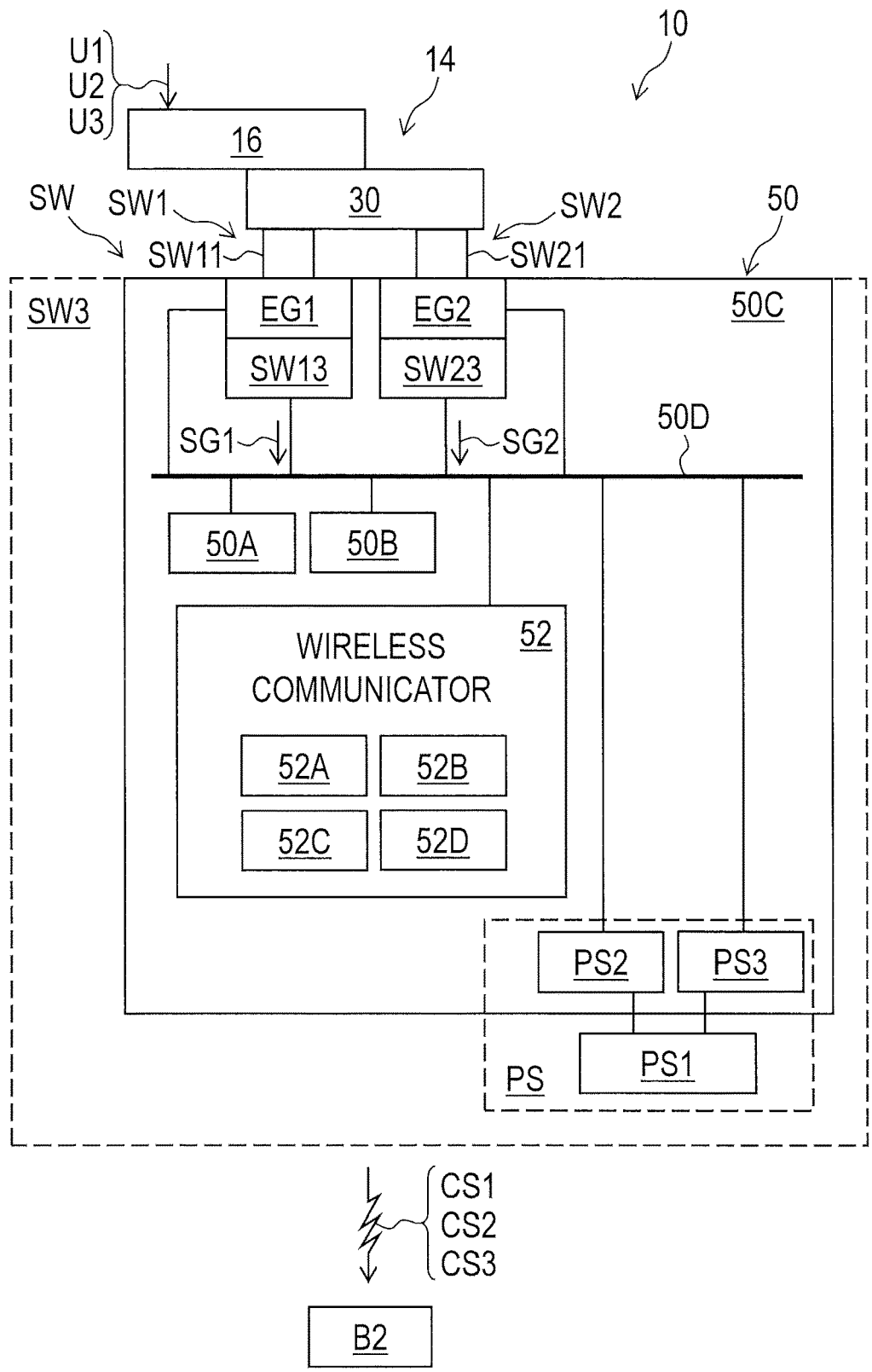
FIG. 17 is a block diagram of the bicycle operating device illustrated in FIG. 1.

As seen in FIG. 17, the bicycle operating device 10 comprises a controller 50. The controller 50 is configured to respectively generate a first control signal CS1 (FIG. 16) and a second control signal CS2 (FIG. 16) based on the first signal pattern SP1 (FIG. 16) and the second signal pattern SP2 (FIG. 16). The controller 50 is configured to respectively generate the first control signal CS1 (FIG. 16), the second control signal CS2 (FIG. 16), and a third control signal CS3 (FIG. 16) based on the first signal pattern SP1 (FIG. 16), the second signal pattern SP2 (FIG. 16), and the third signal pattern SP3 (FIG. 16). The first control signal CS1 is different from the second control signal CS2. The third control signal CS3 is different from the first control signal CS1 and the second control signal CS2. The first to third control signals CS1 to CS3 are distinguishable from each other. The bicycle component B2 is configured to distinguish the first control signal CS1, the second control signal CS2, and the third control signal CS3 as different signals.

The controller 50 is configured to respectively generate the first control signal CS1 in response to the first user input operation U1 and the second control signal CS2 in response to the second user input operation U2. The controller 50 is configured to respectively generate the first control signal CS1 in response to the first user input operation U1, the second control signal CS2 in response to the second user input operation U2, and the third control signal CS3 in response to the third user input operation U3.

The controller 50 includes a processor 50A, a memory 50B, a circuit board 50C, and a bus 50D. The processor 50A, the memory 50B, and the bus 50D are electrically mounted on the circuit board 50C. The processor 50A and the memory 50B are electrically connected to the bus 50D with electrical conductors of the circuit board 50C. The processor 50A is electrically connected to the memory 50B with the bus 50D. Thus, the controller 50 can also be referred to as a control circuit or circuitry 50 in the present application. The processor 50A includes a central processing unit (CPU) and a memory controller. The memory 50B is electrically connected to the processor 50A. The memory 50B includes a read only memory (ROM) and a random-access memory (RAM). The ROM includes a non-transitory computer-readable storage medium. The RAM includes a transitory computer-readable storage medium. The memory 50B includes storage areas each having an address in the ROM and the RAM. The processor 50A controls the memory 50B to store data in the storage areas of the memory 50B and reads data from the storage areas of the memory 50B. The memory 50B (e.g., the ROM) stores a program. The program is read into the processor 50A, and thereby functions of the controller 50 are performed.

As seen in FIG. 15, the controller 50 is provided in the switch structure SW. In this embodiment, the controller 50 is provided in the interior space SW31 of the housing SW3. The circuit board 50C is secured to the housing SW3. However, the controller 50 can be provided at another location outside the switch structure SW.

The first electrical switch SW1 and the second electrical switch SW2 are electrically mounted on the circuit board 50C. The first electrical switch SW1 and the second electrical switch SW2 are electrically connected to the bus 50D (FIG. 17) with the electrical conductors of the circuit board 50C. Each of the processor 50A and the memory 50B is electrically connected to the first electrical switch SW1 and the second electrical switch SW2 with the bus 50D (FIG. 17). Thus, the controller 50 is configured to receive the first signal SG1 and the second signal SG2 from the first electrical switch SW1 and the second electrical switch SW2, respectively.

As seen in FIG. 16, the controller 50 is configured to determine the first operated state based on the first signal SG1. The controller 50 is configured to determine the first OFF state ST11 and the first ON state ST12 based on the first signal SG1. The controller 50 concludes that the first electrical switch SW1 is in the first OFF state ST11 when the controller 50 does not detect the first signal SG1. The controller 50 concludes that the first electrical switch SW1 enters the first ON state ST12 when the controller 50 detects the first signal SG1.

The controller 50 is configured to determine the second operated state based on the second signal SG2. The controller 50 is configured to determine the second OFF state ST21 and the second ON state ST22 based on the second signal SG2. The controller 50 concludes that the second electrical switch SW2 is in the second OFF state ST21 when the controller 50 does not detect the second signal SG2. The controller 50 concludes that the second electrical switch SW2 enters the second ON state ST22 when the controller 50 detects the second signal SG2.

The controller 50 is configured to determine the first signal pattern SP1 and the second signal pattern SP2 based on an order of at least one of the first signal SG1 and the second signal SG2. In this embodiment, the controller 50 is configured to conclude that a signal pattern is the first signal pattern SP1 when the controller 50 detects the first signal SG1 and the first signal SG1 in this order. The controller 50 is configured to conclude that the signal pattern is the second signal pattern SP2 when the controller 50 detects the first signal SG1, the second signal SG2, the second signal SG2, and the first signal SG1 in this order. The controller 50 is configured to conclude that the signal pattern is the third signal pattern SP3 when the controller 50 detects the first signal SG1, the second signal SG2, the first and second signals SG1 and SG2, the first and second signals SG1 and SG2, the second signal SG2, and the first signal SG1 in this order.

As seen in FIG. 17, the controller 50 includes a wireless communicator 52. The wireless communicator 52 is configured to wirelessly transmit the first control signal CS1 and the second control signal CS2. The wireless communicator 52 is configured to wirelessly transmit the first control signal CS1, the second control signal CS2, and the third control signal CS3.

The wireless communicator 52 is electrically connected to the first electrical switch SW1 and the second electrical switch SW2 to wirelessly transmit the first control signal CS1 based on the first signal pattern SP1 (FIG. 16). The wireless communicator 52 is electrically connected to the first electrical switch SW1 and the second electrical switch SW2 to wirelessly transmit the second control signal CS2 based on the second signal pattern SP2 (FIG. 16).

As seen in FIG. 15, the wireless communicator 52 is electrically mounted on the circuit board 50C. In this embodiment, the wireless communicator 52 is constituted as an integrated circuit. However, the wireless communicator 52 can be a plurality of separate circuits or modules. The wireless communicator 52 is a separate circuit from the processor 50A and the memory 50B. However, the wireless communicator 52 can be integrally provided with the processor 50A and the memory 50B as a single integrated circuit.

As seen in FIG. 17, the wireless communicator 52 is electrically connected to the bus 50D with the electrical conductors of the circuit board 50C. The wireless communicator 52 is electrically connected to the processor 50A and the memory 50B with the bus 50D. In this embodiment, the wireless communicator 52 includes a signal generating circuit 52A, a signal transmitting circuit 52B, a signal receiving circuit 52C, and an antenna 52D. The signal generating circuit 52A, the signal transmitting circuit 52B, the signal receiving circuit 52C, and the antenna 52D are electrically mounted on the circuit board 50C. The signal generating circuit 52A, the signal transmitting circuit 52B, the signal receiving circuit 52C, and the antenna 52D are electrically connected to the bus 50D with the electrical conductors of the circuit board 50C. Thus, the wireless communicator 52 can also be referred to as a wireless communication circuit or circuitry 52 in the present application. The program stored in the memory 50B is read into the processor 50A, and thereby functions of the wireless communicator 52 (e.g., at least part of functions of the signal generating circuit 52A, the signal transmitting circuit 52B, and the signal receiving circuit 52C) are performed. Namely, the processor 50A is configured to control the wireless communicator 52 based on the first signal SG1 and the second signal SG2.

The processor 50A is configured to determine the first operated state and the second operated state. In this embodiment, the processor 50A determines the first operated state and the second operated state based on the first signal SG1 and the second signal SG2. Specifically, the processor 50A determines the first signal pattern SP1, the second signal pattern SP2, and the third signal pattern SP3 based on the first signal SG1 and the second signal SG2.

The processor 50A concludes that the signal pattern is the first signal pattern SP1 when the processor 50A detects the first signal SG1 twice in a row (see FIG. 16). The processor 50A is configured to control the signal generating circuit 52A to generate the first control signal CS1 when the processor 50A concludes that the signal pattern is the first signal pattern SP1.

The processor 50A concludes that the signal pattern is the second signal pattern SP2 when the processor 50A detects the first signal SG1, the second signal SG2, the second signal SG2, and the first signal SG1 in this order (see FIG. 16). The processor 50A is configured to control the signal generating circuit 52A to generate the second control signal CS2 when the processor 50A concludes that the signal pattern is the second signal pattern SP2.

The processor 50A concludes that the signal pattern is the third signal pattern SP3 when the processor 50A detects the first signal SG1, the second signal SG2, the first and second signals SG1 and SG2, the first and second signals SG1 and SG2, the second signal SG2, and the first signal SG1 in this order (see FIG. 16). The processor 50A is configured to control the signal generating circuit 52A to generate the third control signal CS3 when the processor 50A concludes that the signal pattern is the third signal pattern SP3.

The signal generating circuit 52A generates the first control signal CS1, the second control signal CS2, and the third control signal CS3 based the control of the processor 50A. The signal generating circuit 52A superimposes digital signals (e.g., the first control signal CS1, the second control signal CS2, or the third control signal CS3) on carrier wave using a predetermined wireless communication protocol to generate the wireless signals. The signal transmitting circuit 52B transmits the wireless signal including the first control signal CS1, the second control signal CS2, or the third control signal CS3 via the antenna 52D. In this embodiment, the signal generating circuit 52A can encrypt the first control signal CS1, the second control signal CS2, or the third control signal CS3 including control information (e.g., shift control command, seatpost control command, suspension control command, auxiliary power unit control command, or other control commands) to generate encrypted wireless signals. The signal generating circuit 52A encrypts the first control signal CS1, the second control signal CS2, or the third control signal CS3 using a cryptographic key. The signal transmitting circuit 52B transmits the encrypted wireless signal. Thus, the wireless communicator 52 wirelessly transmits the first control signal CS1, the second control signal CS2, or the third control signal CS3 to operate the bicycle component B2 when the operating member 16 is pivoted by the user.

Further, the signal receiving circuit 52C receives a wireless signal from another bicycle component (not shown) via the antenna 52D. In this embodiment, the signal receiving circuit 52C decodes the wireless signal to recognize information wirelessly transmitted from the bicycle component B2 or another bicycle component. The signal receiving circuit 52C may decrypt the encrypted wireless signal using the cryptographic key. Namely, the wireless communicator 52 is configured to wirelessly transmit the first to third control signals CS1 to CS3 to control the bicycle component B2 and to receive a wireless signal to recognize information from the bicycle component B2 or another bicycle component. In other words, the wireless communicator 52 is provided as a wireless transmitter and a wireless receiver. In this embodiment, the wireless communicator 52 is integrally provided as a single module or unit. However, the wireless communicator 52 can include a wireless transmitter and a wireless receiver which are provided as separate modules or units arranged at different positions from each other. The signal receiving circuit 52C can be omitted from the wireless communicator 52.

As seen in FIGS. 15 and 17, the bicycle operating device 10 further comprises a first electricity generator EG1 and a second electricity generator EG2. The first electricity generator EG1 is configured to generate electricity in response to a movement of the first input member SW11 of the first electrical switch SW1. The second electricity generator EG2 is configured to generate electricity in response to a movement of the second input member SW21 of the second electrical switch SW2. The first electricity generator EG1 generates the electricity using pressure and/or vibration caused by the movement of the first input member SW11. The second electricity generator EG2 generates the electricity using pressure and/or vibration caused by the movement of the second input member SW21.

Examples of the first electricity generator EG1 and the second electricity generator EG2 include a piezoelectric element. The first electricity generator EG1 is attached to the first switch circuit SW13 and is disposed between the first switch circuit SW13 and the first input member SW11. The second electricity generator EG2 is attached to the second switch circuit SW23 and is disposed between the second switch circuit SW23 and the second input member SW21. However, the first electricity generator EG1 and/or the second electricity generator EG2 can be disposed at other positions. The first electricity generator EG1 and the second electricity generator EG2 are electrically connected to the bus 50D.

As seen in FIG. 17, the bicycle operating device 10 further comprises a power supply PS. The power supply PS is electrically mounted on the circuit board 50C. The power supply PS is electrically connected to the bus 50D. The power supply PS is electrically connected to the wireless communicator 52 to supply electricity to the wireless communicator 52 via the bus 50D.

The power supply PS is electrically connected to the first electricity generator EG1 to accumulate electricity generated by the first electricity generator EG1. The power supply PS is electrically connected to the second electricity generator EG2 to accumulate electricity generated by the second electricity generator EG2. The power supply PS includes a capacitor PS1, a rectifying circuit PS2, and a voltage regulator PS3. Each of the capacitor PS1, the rectifying circuit PS2, and the voltage regulator PS3 are electrically connected to the first electricity generator EG1 and the second electricity generator EG2 to rectify the electric energy generated by at least one of the first electricity generator EG1 and the second electricity generator EG2.

The capacitor PS1 is attached to the housing SW3 of the switch structure SW and is electrically connected to the bus 50D with an electric cable PS4. The rectifying circuit PS2 is electrically mounted on the circuit board 50C and is electrically connected to the bus 50D with the electrical conductors of the circuit board 50C. The capacitor PS1 is electrically connected to the first electricity generator EG1 and the second electricity generator EG2 to accumulate electricity generated by at least one of the first electricity generator EG1 and the second electricity generator EG2. The voltage regulator PS3 regulates the power source voltage to a level at which various circuits of the wireless communicator 52 can properly operate. The regulated power source voltage is applied from the power supply PS to the wireless communicator 52. The first electricity generator EG1, the second electricity generator EG2, the capacitor PS1, and the rectifying circuit PS2 can be omitted from the power supply PS when the power supply PS includes a battery or another power supply source. The power supply PS is provided in the housing SW3. However, the power supply PS can be provided at other positions.

Second Embodiment

A bicycle operating device 210 in accordance with a second embodiment will be described below referring to FIGS. 18 to 20. The bicycle operating device 210 has the same structure and/or configuration as those of the bicycle operating device 10 except for the operating structure 14. Thus, elements having substantially the same function as those in the first embodiment will be numbered the same here, and will not be described and/or illustrated again in detail here for the sake of brevity.

Figure 18:
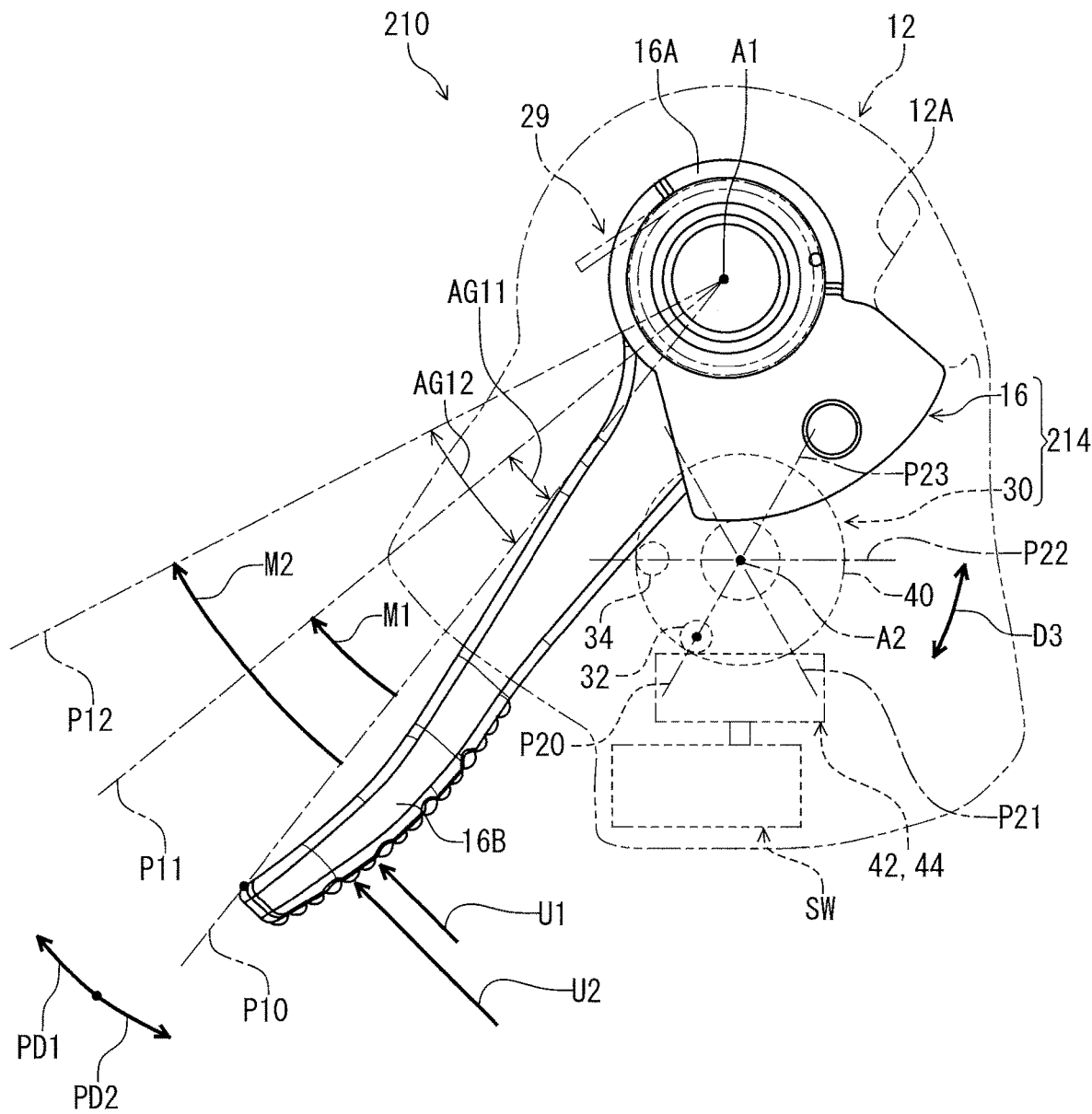
FIG. 18 is a schematic top view of a bicycle operating device in accordance with a second embodiment.
Figure 19:
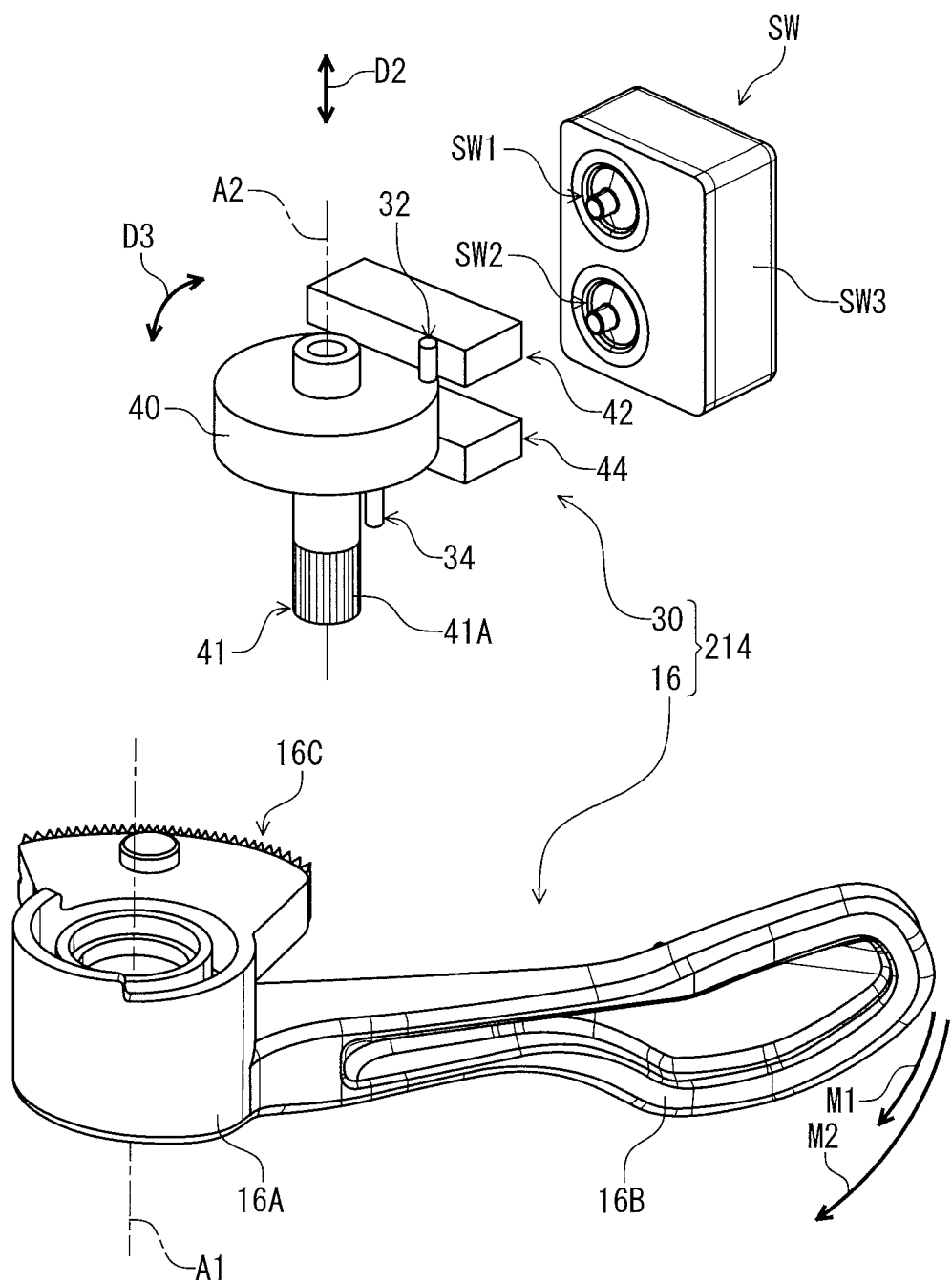
FIG. 19 is an exploded perspective view of an operating structure and a switch structure of the bicycle operating device illustrated in FIG. 18.
Figure 20:
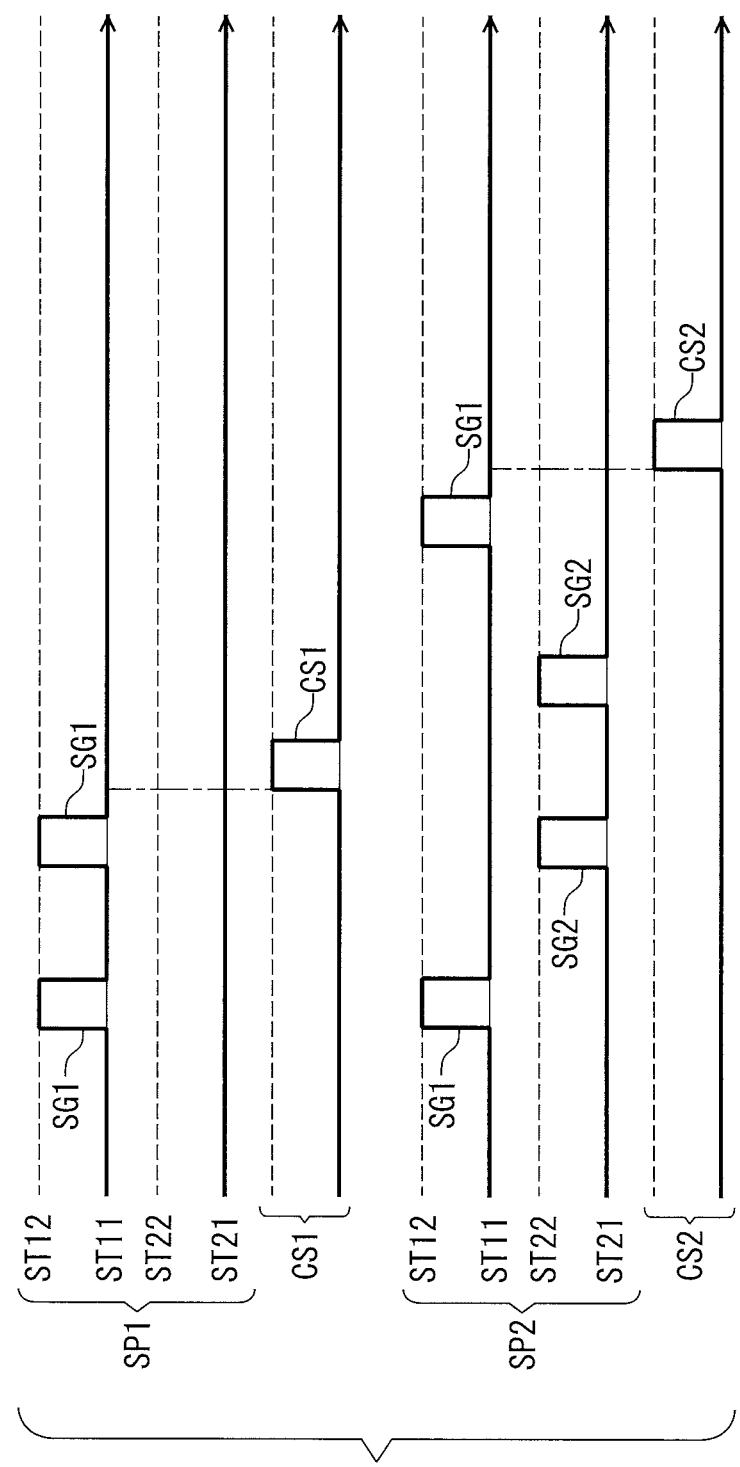
FIG. 20 is a timing chart of the bicycle operating device illustrated in FIG. 18.

As seen in FIGS. 18 and 19, the bicycle operating device 210 comprises an operating structure 214. In this embodiment, the third movement M3 of the operating member 16 is omitted from the operating structure 214. The third and fourth cams 36 and 38 are omitted from the operating structure 214. As seen in FIG. 20, the third signal pattern SP3 and the third control signal CS3 are omitted from the signal patterns of the switch structure SW.

Third Embodiment

A bicycle operating device 310 in accordance with a third embodiment will be described below referring to FIGS. 21 to 23. The bicycle operating device 310 has the same structure and/or configuration as those of the bicycle operating device 10 except for the operating structure 14. Thus, elements having substantially the same function as those in the above embodiments will be numbered the same here, and will not be described and/or illustrated again in detail here for the sake of brevity.

Figure 21:
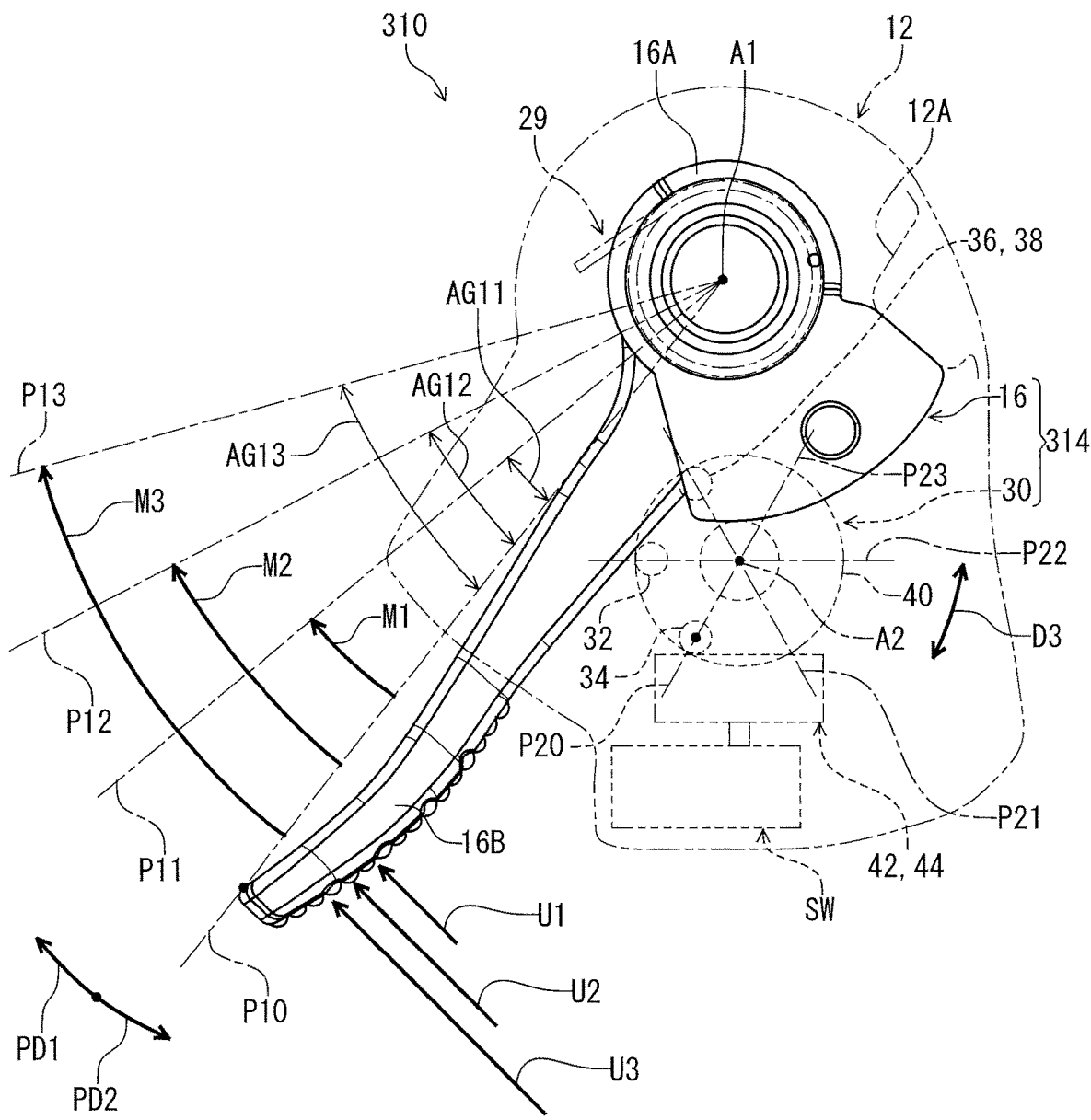
FIG. 21 is a schematic top view of a bicycle operating device in accordance with a third embodiment.
Figure 22:
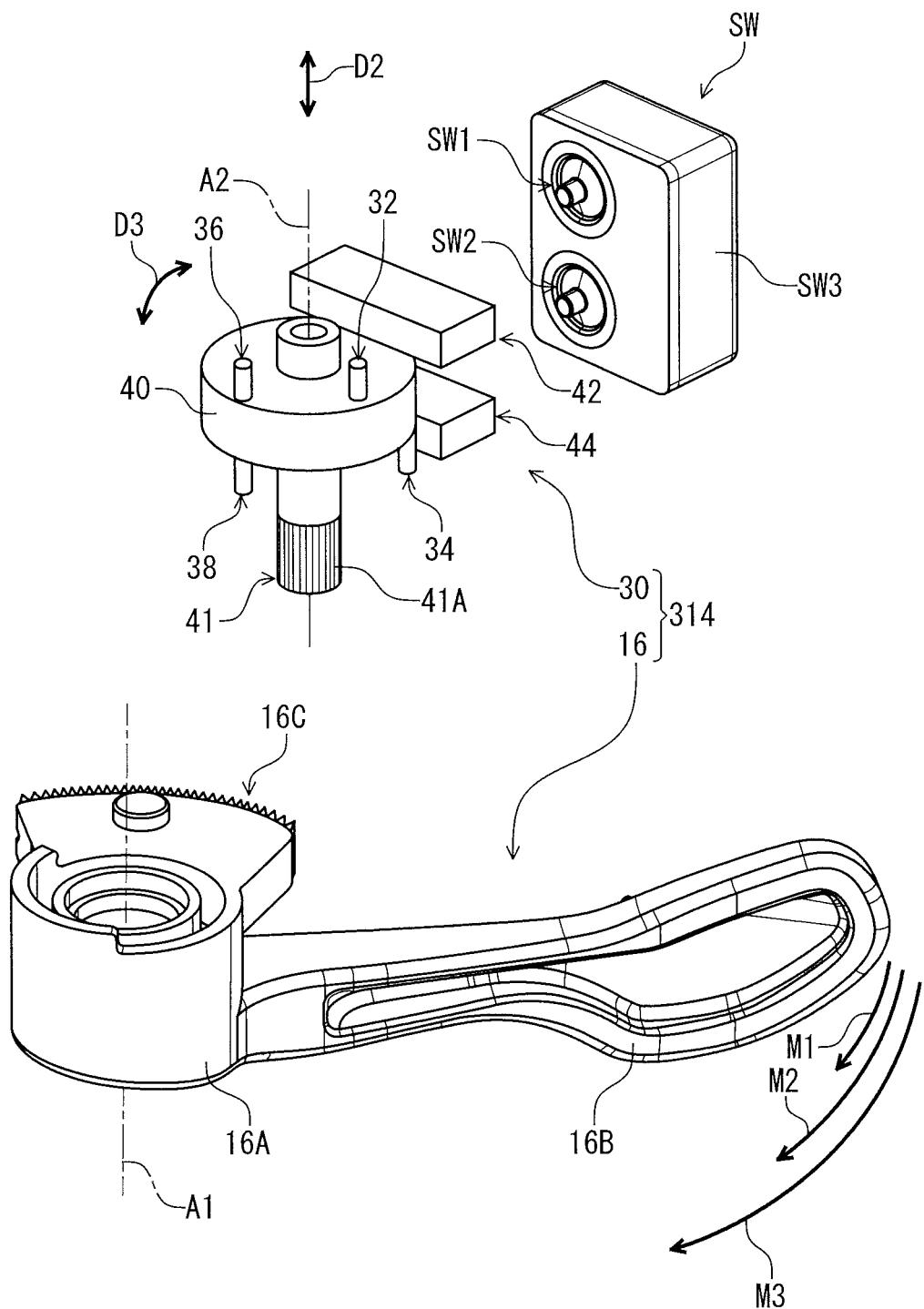
FIG. 22 is an exploded perspective view of an operating structure and a switch structure of the bicycle operating device illustrated in FIG. 21.

As seen in FIGS. 21 and 22, the bicycle operating device 210 comprises an operating structure 314. In this embodiment, the circumferential positions of the first cam 32 and the second earn 34 are switched in the rotational direction D3.

Figure 23:
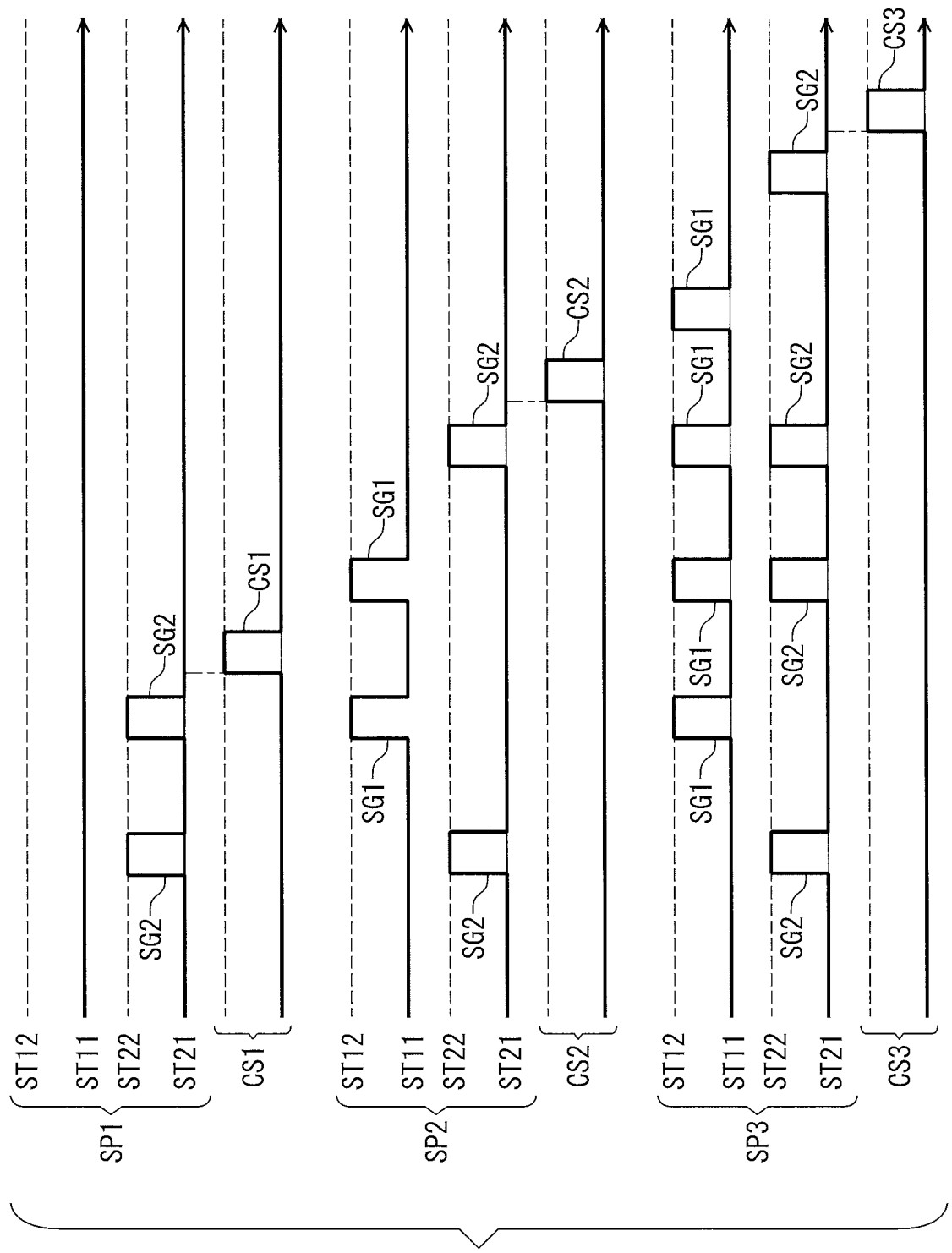
FIG. 23 is a timing chart of the bicycle operating device illustrated in FIG. 21.

As seen in FIG. 23, the first signal pattern SP1 includes the second signal SG2 and the second signal SG2 in this order. The second signal pattern SP2 includes the second signal SG2, the first signal SG2, the first signal SG2, and the second signal SG2 in this order. The third signal pattern SP3 includes the second signal SG2, the first signal SG2, the first and second signals SG1 and SG2, the first and second signals SG1 and SG2, the first signal SG2, and the second signal SG2 in this order.

Fourth Embodiment

A bicycle operating device 410 in accordance with a fourth embodiment will be described below referring to FIGS. 24 and 25. The bicycle operating device 410 has the same structure and/or configuration as those of the bicycle operating device 210 except for the operating structure 214. Thus, elements having substantially the same function as those in the above embodiments will be numbered the same here, and will not be described and/or illustrated again in detail here for the sake of brevity.

Figure 24:
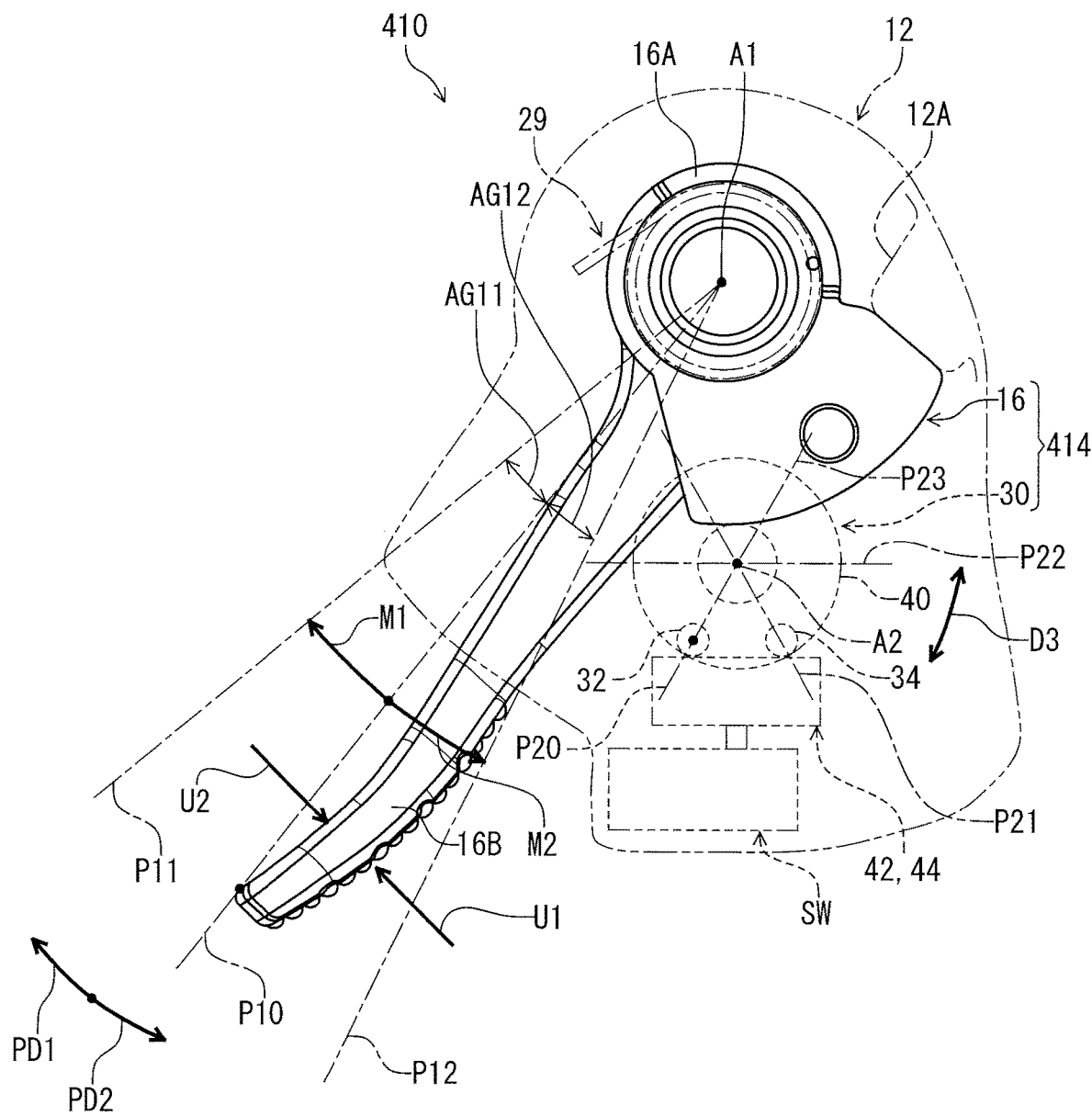
FIG. 24 is a schematic top view of a bicycle operating device in accordance with a fourth embodiment.

As seen in FIG. 24, the bicycle operating device 410 comprises an operating structure 414. The operating member 16 is pivoted relative to the base member 12 about the pivot axis A1 in the first pivot direction PD1 in response to the first user input operation U1. In this embodiment, the operating member 16 is pivoted relative to the base member 12 about the pivot axis A1 in the second pivot direction PD2 in response to the second user input operation U2. A circumferential position of the second cam 34 is different from the circumferential position of the second cam 34 of the operating structure 214. The second pivot angle AG12 can be equal to or different from the first pivot angle AG11.

Figure 25:
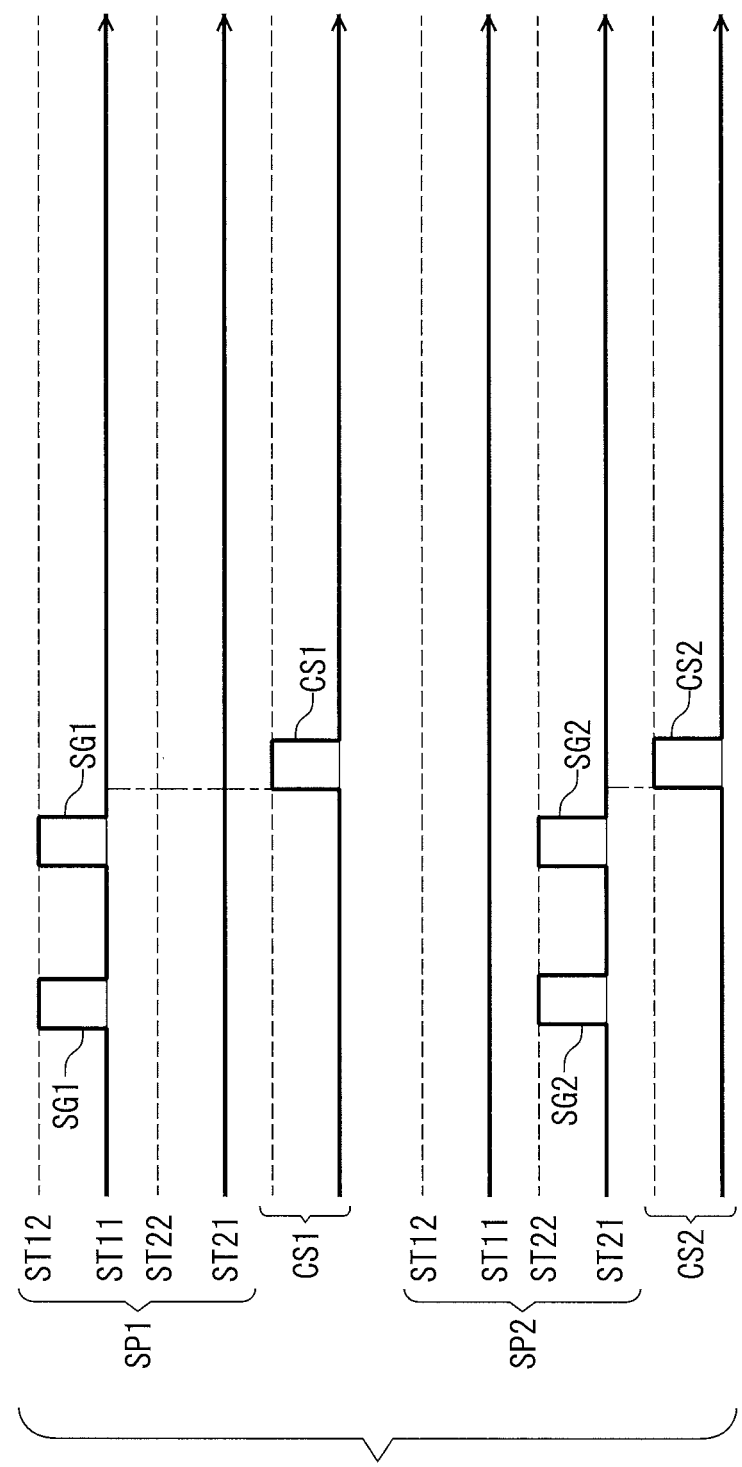
FIG. 25 is a timing chart of the bicycle operating device illustrated in FIG. 24.

As seen in FIG. 25, the first signal pattern SP1 includes the first signal SG1 and the first signal SG1 in this order. The second signal pattern SP2 includes the second signal SG2 and the second signal SG2 in this order.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The term's "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member;
   a switch structure comprising:
      a first electrical switch configured to generate a first signal, the first electrical switch having a first operated state; and
      a second electrical switch configured to generate a second signal, the second electrical switch having a second operated state;
   an operating structure including an operating member movably coupled to the base member, the operating member being movable relative to the base member in response to a first user input operation to provide a first movement, the operating member being movable relative to the base member in response to a second user input operation to provide a second movement different from the first movement, the operating structure being operatively coupled to the switch structure to generate a first signal pattern including at least one of the first signal and the second signal in response to the first user input operation, the operating structure being operatively coupled to the switch structure to generate a second signal pattern including at least one of the first signal and the second signal in response to the second user input operation, the second user input operation being different from the first user input operation, the second signal pattern being different from the first signal pattern; and
   a controller configured to respectively generate a first control signal and a second control signal based on the first signal pattern and the second signal pattern regardless of a period of time for which the operating member is operated, the first signal pattern including a first combination of the first operated state and the second operated state, the second signal pattern including a second combination of the first operated state and the second operated state, the second combination being different from the first combination.

2. The bicycle operating device according to claim 1, wherein
   the first movement has a first amount of movement of the operating member,
   the second movement has a second amount of movement of the operating member, and
   the second amount of movement is different from the first amount of movement.

3. The bicycle operating device according to claim 2, wherein
   the operating member is pivotable relative to the base member about a pivot axis,
   the first movement includes a first pivotal movement having a first pivot angle corresponding to the first amount of movement,
   the second movement includes a second pivotal movement having a second pivot angle corresponding to the second amount of movement, and
   the second pivot angle is different from the first pivot angle.

4. The bicycle operating device according to claim 1, wherein
   the operating structure includes an intermediate structure provided between the operating member and the switch structure to transmit each of the first movement and the second movement to the switch structure.

5. The bicycle operating device according to claim 4, wherein
   the intermediate structure includes
      a first cam movable relative to the base member to press the first electrical switch in response to at least one of the first movement and the second movement, and
      a second cam movable relative to the base member to press the second electrical switch in response to at least one of the first movement and the second movement.

6. The bicycle operating device according to claim 5, wherein
   the intermediate structure includes a rotatable member rotatably coupled to the base member about a rotational axis, and
   the first cam and the second cam are coupled to the rotatable member to rotate relative to the base member along with the rotatable member about the rotational axis.

7. The bicycle operating device according to claim 6, wherein
   the intermediate structure includes
      a first follower provided between the first cam and the first electrical switch to be contactable with the first cam, and
      a second follower provided between the second cam and the second electrical switch to be contactable with the second cam.

8. The bicycle operating device according to claim 7, wherein
   the first cam is rotatable relative to the base member on a first path in response to a rotation of the rotatable member,
   the second cam is rotatable relative to the base member on a second path in response to a rotation of the rotatable member,
   the first follower is provided on the first path to be contactable with the first cam, and the second follower is provided on the second path to be contactable with the second cam.

9. The bicycle operating device according to claim 7, wherein
the first follower and second follower are arranged in an axial direction of the rotational axis.

10. The bicycle operating device according to claim 5, wherein
the second cam is offset from the first cam in a rotational direction of the rotatable member.

11. The bicycle operating device according to claim 5, wherein
the rotatable member includes a first surface and a second surface,
the second surface is provided on a reverse side of the first surface in an axial direction of the rotational axis,
the first cam is provided on the first surface, and
the second cam is provided on the second surface.

12. The bicycle operating device according to claim 11, wherein
the first cam extends from the first surface in the axial direction, and
the second cam extends from the second surface in the axial direction.

13. The bicycle operating device according to claim 5, wherein
the first cam includes a first curved surface, and
the second cam includes a second curved surface.

14. The bicycle operating device according to claim 1, wherein
the controller includes a wireless communicator,
the wireless communicator is electrically connected to the first electrical switch and the second electrical switch to wirelessly transmit the first control signal based on the first signal pattern, and
the wireless communicator is electrically connected to the first electrical switch and the second electrical switch to wirelessly transmit the second control signal based on the second signal pattern.

15. The bicycle operating device according to claim 1, wherein
the controller is configured to determine the first operated state based on the first signal, and
the controller is configured to determine the second operated state based on the second signal.

16. The bicycle operating device according to claim 1, wherein
the first operated state has
a first OFF state, and
a first ON state to generate the first signal,
the second operated state has
a second OFF state, and
a second ON state to generate the second signal,
the controller is configured to determine the first OFF state and the first ON state based on the first signal, and
the controller is configured to determine the second OFF state and the second ON state based on the second signal.

17. The bicycle operating device according to claim 16, wherein
the first signal pattern includes a first combination of the first signal and the second signal,
the second signal pattern includes a second combination of the first signal and the second signal, and
the second combination is different from the first combination.

18. The bicycle operating device according to claim 16, wherein
the controller is configured to determine the first signal pattern and the second signal pattern based on an order of at least one of the first signal and the second signal.

19. The bicycle operating device according to claim 1, wherein
the controller is configured to generate a third control signal based on a third signal pattern regardless of the period of time for which the operating member is operated,
the third signal pattern includes a third combination of the first operated state and the second operated state, and
the third combination is different from the first combination and the second combination.

20. A bicycle operating device comprising:
a base member;
a switch structure comprising:
a first electrical switch configured to generate a first signal, the first electrical switch having a first operated state; and
a second electrical switch configured to generate a second signal, the second electrical switch having a second operated state;
an operating structure including an operating member movably coupled to the base member, the operating member being movable relative to the base member in response to a first user input operation to provide a first movement, the operating member being movable relative to the base member in response to a second user input operation to provide a second movement different from the first movement, the operating structure being operatively coupled to the switch structure to generate a first signal pattern including at least one of the first signal and the second signal in response to the first user input operation, the operating structure being operatively coupled to the switch structure to generate a second signal pattern including at least one of the first signal and the second signal in response to the second user input operation, the second user input operation being different from the first user input operation, the second signal pattern being different from the first signal pattern; and
a controller configured to respectively generate a first control signal and a second control signal based on the first signal pattern and the second signal pattern, the first signal pattern including a first combination of the first operated state and the second operated state, the second signal pattern including a second combination of the first operated state and the second operated state, the second combination being different from the first combination,
the operating structure including an intermediate structure provided between the operating member and the switch structure to transmit each of the first movement and the second movement to the switch structure,
the intermediate structure including
a first cam movable relative to the base member to press the first electrical switch in response to at least one of the first movement and the second movement, and
a second cam movable relative to the base member to press the second electrical switch in response to at least one of the first movement and the second movement,
the operating member being movable relative to the base member in response to a third user input operation to provide a third movement, the third user input operation being different from the first user input operation and the second user input operation, and the intermediate structure including
- a third cam movable relative to the base member to press the first electrical switch in response to at least one of the first movement, the second movement, and the third movement, and
- a fourth cam movable relative to the base member to press the second electrical switch in response to at least one of the first movement, the second movement, and the third movement.

21. The bicycle operating device according to claim 20, wherein
the second cam is offset from the first cam in a rotational direction of the rotatable member,
the third cam is offset from the first cam and the second cam in the rotational direction, and
the fourth cam is offset from the first cam and the second cam in the rotational direction.

22. The bicycle operating device according to claim 21, wherein
the second cam is offset from the first cam in a rotational direction of the rotatable member, and
the fourth cam is provided at a circumferential position equal to a circumferential position of the third cam in the rotational direction.

23. The bicycle operating device according to claim 20, wherein
the rotatable member includes a first surface and a second surface,
the second surface is provided on a reverse side of the first surface in an axial direction of the rotational axis,
the first cam and the third cam are provided on the first surface, and
the second cam and the fourth cam are provided on the second surface.

24. The bicycle operating device according to claim 23, wherein
the first cam and the third cam extend from the first surface in the axial direction, and
the second cam and the fourth cam extend from the second surface in the axial direction.

25. The bicycle operating device according to claim 20, wherein
the first cam includes a first curved surface,
the second cam includes a second curved surface,
the third cam includes a third curved surface, and
the fourth cam includes a fourth curved surface.

26. A bicycle operating device comprising:
a base member;
an operating structure including an operating member movably coupled to the base member, the operating member being movable relative to the base member in response to a first user input operation to provide a first movement having a first amount of movement of the operating member, the operating member being movable relative to the base member in response to a second user input operation to provide a second movement having a second amount of movement of the operating member, the second amount of movement being different from the first amount of movement; and
a controller configured to respectively generate a first control signal in response to the first user input operation and a second control signal in response to the second user input operation, the first control signal being different from the second control signal, the controller including a wireless communicator configured to wirelessly transmit the first control signal and the second control signal.

27. The bicycle operating device according to claim 26, wherein
the controller is configured to respectively generate the first control signal and the second control signal in response to the first user input operation and the second user input operation regardless of a period of time for which the operating member is operated.

28. The bicycle operating device according to claim 27, wherein
the controller is configured to respectively generate the first control signal and the second control signal in response to the first user input operation and the second user input operation regardless of a first period of time for which the first user input operation is input and a second period of time for which the second user input operation is input.

29. The bicycle operating device according to claim 26, wherein
the operating member is movable relative to the base member from a rest position to a first operated position to provide the first movement in response to the first user input operation,
the operating member is movable relative to the base member from the rest position to a second operated position through the first operated position to provide the second movement in response to the second user input operation, and
the first operated position is closer to the rest position than the second operated position.

* * * * *